(12) United States Patent
Manabe et al.

(10) Patent No.: US 12,479,992 B2
(45) Date of Patent: *Nov. 25, 2025

(54) BIAXIALLY ORIENTED POLYESTER FILM AND PRODUCTION METHOD THEREFOR

(71) Applicant: TOYOBO CO., LTD., Osaka (JP)

(72) Inventors: Nobuyuki Manabe, Inuyama (JP); Masayuki Haruta, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 110 days.

This patent is subject to a terminal disclaimer.

(21) Appl. No.: 18/262,163

(22) PCT Filed: Jan. 26, 2022

(86) PCT No.: PCT/JP2022/002851
§ 371 (c)(1),
(2) Date: Jul. 19, 2023

(87) PCT Pub. No.: WO2022/168702
PCT Pub. Date: Aug. 11, 2022

(65) Prior Publication Data
US 2024/0124705 A1 Apr. 18, 2024

(30) Foreign Application Priority Data
Feb. 3, 2021 (JP) .................... 2021-015840

(51) Int. Cl.
*C08J 5/18* (2006.01)
*B29C 48/00* (2019.01)
(Continued)

(52) U.S. Cl.
CPC .......... *C08L 67/02* (2013.01); *B29C 48/0018* (2019.02); *B29C 48/022* (2019.02);
(Continued)

(58) Field of Classification Search
CPC ........................................................ C08J 5/18
(Continued)

(56) References Cited

U.S. PATENT DOCUMENTS

| 4,761,327 A | 8/1988 | Hamano et al. |
| 6,025,056 A * | 2/2000 | Machii ............ B32B 27/08 |
| | | 428/458 |

(Continued)

FOREIGN PATENT DOCUMENTS

| CN | 106142794 A | 11/2016 |
| EP | 1066960 A2 | 1/2001 |

(Continued)

OTHER PUBLICATIONS

Machine_English_translation_WO_2020195742_A1; Goto, Polyester Film and Production Method therefor; Oct. 1, 2020; EPO; whole document (Year: 2024).*

(Continued)

*Primary Examiner* — Tahseen Khan
(74) *Attorney, Agent, or Firm* — Leydig, Voit & Mayer, Ltd.

(57) ABSTRACT

The invention provides a biaxially oriented polyester film, which exhibits excellent transparency, is easily subjected to secondary processing, is an environmentally friendly polyester film, and has little variations in physical properties in the machine direction, and a production method therefor. The biaxially oriented polyester film is formed of a polyester resin composition containing particles and 50% by weight or more of a polyester resin composed of biomass-derived ethylene glycol and fossil fuel-derived dicarboxylic acid units, wherein at least one surface of the biaxially oriented polyester film meets requirements (1) to (3): (1) a number of fine protrusions each having a height of less than 3 nm per area of $4 \times 10^{-12}$ m$^2$ is 250-600; (2) a number of fine protru- (Continued)

sions each having a height of 3 nm or more per area of $4 \times 10^{-12}$ m² is 300-600; and (3) an arithmetic mean height Sa is 0.010-0.025 μm.

17 Claims, 5 Drawing Sheets

(51) Int. Cl.
  B29C 48/08    (2019.01)
  B29C 48/28    (2019.01)
  B29C 48/285   (2019.01)
  C08L 67/02    (2006.01)
  B29C 55/12    (2006.01)
  B29K 67/00    (2006.01)
(52) U.S. Cl.
  CPC .......... *B29C 48/08* (2019.02); *B29C 48/28* (2019.02); *B29C 48/288* (2019.02); *C08J 5/18* (2013.01); *B29C 55/12* (2013.01); *B29K 2067/00* (2013.01); *B29K 2995/0026* (2013.01); *B29K 2995/0053* (2013.01); *B29K 2995/0072* (2013.01); *C08J 2367/02* (2013.01); *C08J 2467/02* (2013.01)
(58) Field of Classification Search
  USPC ......................................................... 428/141
  See application file for complete search history.

(56) References Cited

U.S. PATENT DOCUMENTS

| | | | |
|---|---|---|---|
| 6,291,053 | B1 | 9/2001 | Peiffer et al. |
| 7,208,565 | B1 | 4/2007 | Nakajima et al. |
| 2004/0058805 | A1 | 3/2004 | Nakajima et al. |
| 2013/0344345 | A1 | 12/2013 | Sakellarides et al. |
| 2017/0151746 | A1 | 6/2017 | Klein et al. |
| 2022/0024111 | A1 | 1/2022 | Nakano et al. |
| 2022/0056223 | A1* | 2/2022 | Haruta ................ B29C 48/0018 |
| 2022/0126495 | A1 | 4/2022 | Haruta et al. |
| 2022/0251314 | A1* | 8/2022 | Manabe .................. B32B 27/08 |
| 2023/0001619 | A1 | 1/2023 | Manabe et al. |
| 2024/0101770 | A1 | 3/2024 | Manabe et al. |

FOREIGN PATENT DOCUMENTS

| | | | |
|---|---|---|---|
| EP | 0807517 B1 | | 11/2006 |
| JP | H10-119172 A | | 5/1998 |
| JP | H11-010725 A | | 1/1999 |
| JP | 2002-249565 A | | 9/2002 |
| JP | 2002-249602 A | | 9/2002 |
| JP | 2002370277 A | * | 12/2002 |
| JP | 3461175 B2 | | 10/2003 |
| JP | 3506236 B2 | | 3/2004 |
| JP | 4834923 B2 | | 12/2011 |
| JP | 2012-097163 A | | 5/2012 |
| JP | 2014-065282 A | | 4/2014 |
| JP | 2017-100446 A | | 6/2017 |
| WO | WO 2016/080342 A1 | | 5/2016 |
| WO | WO 2020/031197 A1 | | 2/2020 |
| WO | WO 2020/095725 A1 | | 5/2020 |
| WO | WO 2020/166353 A1 | | 8/2020 |
| WO | WO 2020/170819 A1 | | 8/2020 |
| WO | WO 2020/203105 A1 | | 10/2020 |
| WO | WO-2020195742 A1 | * | 10/2020 |
| WO | WO 2021/019965 A1 | | 2/2021 |
| WO | WO 2021/117736 A1 | | 6/2021 |
| WO | WO 2022/168703 A1 | | 8/2022 |

OTHER PUBLICATIONS

Machine_English_translation_JP_2002370277_A; Hiraoka, Vapor Depositing Polyester Film and Vapor Deposited Polyester film; Dec. 24, 2002; EPO; whole document (Year: 2024).*
The International Bureau of Wipo, International Preliminary Report on Patentability in International Patent Application No. PCT/JP2022/002851 (Aug. 3, 2023).
Japan Patent Office, International Search Report in International Patent Application No. PCT/JP2022/002851 (Mar. 15, 2022).
European Patent Office, Extended European Search Report in European Patent Application No. 22749576.9 (Nov. 28, 2024).
China National Intellectual Property Adminsitration, First Office Action in Chinese Patent Application No. 202080054406.1 (Feb. 16, 2023).
China National Intellectual Property Administration, Second Office Action in Chinese Patent Application No. 202080054406.1 (Jul. 14, 2023).
European Patent Office, Extended European Search Report in European Patent Application No. 20847260.5 (Jul. 11, 2023).
European Patent Office, Extended European Search Report in European Patent Application No. 20898153.0 (Dec. 11, 2023).
European Patent Office, Extended European Search Report in European Patent Application No. 22749577.7 (Dec. 3, 2024).
Intellectual Property India, Examination Report in Indian Patent Application No. 202247003030 (Sep. 12, 2023).
Japan Patent Office, International Search Report in International Application No. PCT/JP2020/045721 (Mar. 16, 2021).
Japan Patent Office, International Search Report in International Patent Application No. PCT/JP2022/002852 (Mar. 15, 2022).
Japanese Patent Office, International Search Report in International Patent Application No. PCT/JP2020/024621 (Aug. 25, 2020).
Japan Patent Office, Office Action in Japanese Patent Application No. 2021-536834 (Apr. 2, 2024).
Taiwan Intellectual Property Office, Office Action in Taiwanese Patent Application No. 109121024 (Jun. 19, 2024).
The International Bureau of Wipo, International Preliminary Report on Patentability in International Patent Application No. PCT/JP2022/002852 (Aug. 3, 2023).

* cited by examiner

BIAXIALLY ORIENTED POLYESTER FILM AND PRODUCTION METHOD THEREFOR

TECHNICAL FIELD

The present invention relates to a biaxially oriented polyester film and a production method therefor. Specifically, the present invention relates to a biaxially oriented polyester film, which is suitable for secondary processing such as coating and vapor deposition to further enhance the functions thereof, and is an environmentally friendly polyester film produced using a carbon-neutral polyester resin obtained from biomass ethylene glycol as well as has little variations in physical properties in the machine direction when being wound into a long film roll having a long winding length as well, and a production method therefor.

BACKGROUND ART

Conventionally, biaxially oriented polyester films have been widely utilized in a wide range of fields such as packaging materials and industrial materials because of their excellent mechanical strength, thermal properties, optical properties, and the like. Biaxially oriented polyester films exhibit excellent oxygen barrier properties, but there have been increasing demands for oxygen barrier properties and water vapor barrier properties related to denaturation and degradation of the contents and there is a problem that the contents are denatured and degraded in packaging applications for general food products, retort pouch food products, pharmaceuticals and the like.

Hence, measures are taken for biaxially oriented polyester films used in packaging applications for general food products, retort pouch food products, pharmaceuticals and the like to further improve the adhesive properties to printing ink and further improve the gas barrier properties such as oxygen barrier properties and water vapor barrier properties.

For example, as a method to improve gas barrier properties, there is a method in which a film formed of a resin exhibiting favorable gas barrier properties such as polyvinylidene chloride or polyethylene vinyl alcohol copolymer is pasted to a biaxially oriented polyester film, a method in which a thin film is laminated by applying a liquid in which these resins are dissolved, or a method in which a thin film is formed on the film surface by depositing a metal such as aluminum or a metal oxide such as aluminum oxide.

In particular, a vapor-deposited polyester film in which a metal oxide is provided on the film surface is excellent from the perspective of heat resistance and transparency in addition to gas barrier properties, and is thus often used.

However, it has not been easy to industrially stably obtain a vapor-deposited polyester film, which exhibits favorable gas barrier properties and has a metal oxide thin film such as a silicon oxide or aluminum oxide film provided on the film surface.

Hence, the gas barrier properties of a vapor-deposited polyester film are improved by controlling the surface state of the biaxially oriented polyester film used as the base material of the vapor-deposited polyester film. A biaxially oriented polyester film in which the surface roughness of the center plane and the number of protrusions are prescribed (see, for example, Patent Document 1) and a biaxially oriented polyester film in which the surface roughness of the center line is prescribed (see, for example, Patent Document 2) have been proposed.

Furthermore, a biaxially oriented polyester film in which the number of fine protrusions each having a specific height or higher is controlled has been proposed (see, for example, Patent Document 3).

All of these films focus only on improving the gas barrier properties after a metal oxide thin film is provided, but it cannot be said that the improvement of wrinkling of the film roll and the adhesion between the films in the film roll, so-called blocking, when the film is wound into a film roll after being produced is sufficient. Moreover, the performance after secondary processing such as coating and vapor deposition has not also been sufficient.

In recent years, along with the increasing demand for building a recycling-based society, there has been a desire to break away from fossil fuels and the use of biomass has attracted attention in the field of materials as with energy. Biomass is an organic compound photosynthesised from carbon dioxide and water, and is a so-called carbon-neutral renewable energy that can be converted into carbon dioxide and water again by being used. Nowadays, the practical use of biomass plastics obtained using the biomass as a raw material is rapidly progressing, and it has also been attempted to produce polyester, which is a general-purpose polymer material, from the biomass raw materials.

For example, Patent Document 4 discloses a resin composition containing a polyester composed of a diol unit and a dicarboxylic acid unit, in which a polyester of which the diol component unit is biomass-derived ethylene glycol and the dicarboxylic acid component unit is petroleum-derived dicarboxylic acid is contained at 50% to 95% by mass with respect to the entire resin composition; and a film.

According to this technology, it is said that a polyester of which a raw material is plant-derived ethylene glycol instead of ethylene glycol obtained from conventional fossil fuels is a polyester produced using ethylene glycol obtained from conventional fossil fuels, but exhibits mechanical characteristics equivalent to those of a polyester produced using conventional fossil fuel-derived ethylene glycol.

However, a vapor-deposited polyester film, which exhibits favorable gas barrier properties and has a metal oxide thin film such as a silicon oxide or aluminum oxide film provided on the film surface is not mentioned, and porous silica having an average particle size of 0.9 μm is used, but the maximum peak height Sp is likely to be small, there is a problem that wrinkling and blocking occur by poor air release from the film roll, and this has not been sufficiently taken into consideration. Environmentally friendly polyester films, which exhibit excellent transparency, are easily subjected to secondary processing such as coating and vapor deposition, exhibit excellent properties after secondary processing, and are produced using carbon-neutral polyester resins obtained using biomass-derived ethylene glycol, have not yet been realized.

As a means to obtain environmentally friendly polyester films, which exhibit excellent transparency, are easily subjected to secondary processing such as coating and vapor deposition, exhibit excellent properties after secondary processing, and are produced using carbon-neutral polyester resins obtained using biomass-derived ethylene glycol, as described above, it can be expected to obtain the environmentally friendly polyester films by biaxially stretching polyester resin compositions in which polyester resins containing particles are blended with carbon-neutral polyester resins obtained using biomass-derived ethylene glycol, and it is common to mix resin chips having a normal specific gravity and resin chips, which contain particles and have a large specific gravity, to form a film. However, since there is a large difference in the specific gravities of resin chips that contain particles and ordinary resin chips, segregation of these raw material resin chips tends to cause occurrence of variation in the raw material ratio during the mixing and extrusion process, causing occurrence of differences in physical properties in the machine direction of the film. As a result, there is a case where a product exhibiting uniform physical properties in the machine direction of a long product roll is not obtained.

PRIOR ART DOCUMENTS

Patent Document

Patent Document 1: JP-A-10-119172
Patent Document 2: JP-A-11-010725
Patent Document 3: JP-B-4834923
Patent Document 4: JP-A-2012-097163

DISCLOSURE OF THE INVENTION

Problems to be Solved by the Invention

An object of the present invention is to improve the problems of the prior art and to provide an environmentally friendly biaxially oriented polyester film, which exhibits excellent transparency, is easily subjected to secondary processing such as coating and vapor deposition, exhibits excellent properties after secondary processing, and is produced using a carbon-neutral polyester resin obtained using biomass-derived ethylene glycol; and a production method therefor, and more suitably to provide a biaxially oriented polyester film roll having little variations in physical properties in the machine direction when being a long film roll having a long winding length as well; and a production method therefor.

Means for Solving the Problem

The present inventors have investigated the causes, which decrease the properties after secondary processing, as a result, found out that since a biaxially oriented polyester film has electrical insulation, static marks, which are locally charged parts, and static mark discharge marks due to the discharge of stored static electricity and the like are likely to be generated by contact with the transport roll, peeling off and the like in the film producing process and secondary processing process, and it is difficult for coated dissolved resin and vapor-deposited inorganic oxide molecules to form a thin film regularly and uniformly on the film surface without defects at this part.

As a result of diligent studies, the present inventors have found out that in a biaxially oriented polyester film obtained by biaxially stretching a polyester resin composition in which a polyester resin containing particles is blended with a carbon-neutral polyester resin obtained using biomass-derived ethylene glycol, it is possible to obtain a uniform film having little variations in physical properties in the machine direction of the film by supplying the polyester resin chips recycled from the market and society, including PET bottles to the hopper from above as well as supplying the polyester resin chips containing particles through a pipe (hereinafter, referred to as an inner pipe in some cases) having an outlet in the hopper and directly above the extruder when the resin chips, which are the raw materials, are mixed, mixing both chips, and melt-extruding the mixture. Furthermore, the present inventors have found out that it is possible to suppress the generation of locally strongly charged parts called static marks and discharge marks described above and improve the performance after secondary processing, for example, gas barrier properties by setting the number of fine protrusions each having a specific height or lower on the film surface on the side where the coating film or the vapor-deposited film is formed to a specific number or more, and it is possible to improve the slipperiness between films by setting the number of fine protrusions each having a specific height or higher and the shape of protrusions to specific ranges, and thus completed the present invention.

In other words, the present invention has the following configuration.

1. A biaxially oriented polyester film formed of a polyester resin composition containing particles and 50% by weight or more of a polyester resin composed of biomass-derived ethylene glycol and fossil fuel-derived dicarboxylic acid units, of which at least one surface meets all of the following requirements (1) to (3):
   (1) a number of fine protrusions each having a height of less than 3 nm per area of $4\times10^{-12}$ m$^2$ is 250 or more and 600 or less;
   (2) a number of fine protrusions each having a height of 3 nm or more per area of $4\times10^{-12}$ m$^2$ is 300 or more and 600 or less; and
   (3) an arithmetic mean height Sa is 0.010 μm or more and 0.025 μm or less.

2. The biaxially oriented polyester film according to 1., in which a content of biomass-derived carbon by radiocarbon (C14) measurement is 10% to 18% with respect to total carbon in the biaxially oriented polyester film.

3. The biaxially oriented polyester film according to 1. or 2., in which a dynamic friction coefficient between a surface meeting all of the requirements (1) to (3) of the biaxially oriented polyester film and a surface facing the surface is 0.20 or more and 0.60 or less.

4. The biaxially oriented polyester film according to any one of 1. to 3., in which a wetting tension of a surface meeting all of the requirements (1) to (3) of the biaxially oriented polyester film is 50 mN/m or more.

5. The biaxially oriented polyester film according to any one of 1. to 4., in which an external haze of the biaxially oriented polyester film is 1.8% or less and an internal haze is 2.0% or less.

6. A biaxially oriented polyester film roll, which is a film roll obtained by winding the biaxially oriented polyester film according to any one of 1. to 5. into a roll, in which a variation in a number of fine protrusions each having a height of less than 3 nm per area of $4\times10^{-12}$ m$^2$ and a variation in a number of fine protrusions each having a height of 3 nm or more per area of $4\times10^{-12}$ m$^2$ when sampling is performed every 1,000 m from a surface layer of the film roll to a winding core in a machine direction of the film are both 40% or less:
(each variation is expressed by the following Equation [1] where Xmax denotes a maximum value, Xmin denotes a minimum value, and Xave denotes an average value, $$\text{variation (\%)}=100\times(X\text{max}-X\text{min})/X\text{ave} \qquad [1]).$$

7. The biaxially oriented polyester film roll according to 6., in which a variation in an arithmetic mean height Sa when sampling is performed every 1,000 m from a surface layer of the film roll to a winding core in a machine direction of the film is 40% or less:

(variation is expressed by the following Equation [2] where Xmax denotes a maximum value of an arithmetic mean height Sa, Xmin denotes a minimum value, and Xave denotes an average value, $$\text{variation (\%)} = 100 \times (X\text{max} - X\text{min})/X\text{ave} \quad [2]).$$

8. A production method for the biaxially oriented polyester film according to any one of 1. to 5., the production method including a step of performing melt extrusion of a polyester raw material resin and a biaxial stretching step, in which the step of performing melt extrusion of the polyester raw material resin includes a step of supplying raw material resin chips of a carbon-neutral polyester resin obtained using the biomass-derived ethylene glycol to a hopper from above as well as supplying raw material resin chips of a polyester resin composition containing the particles through a pipe having an outlet in the hopper and directly above an extruder, mixing both chips, and melt-extruding the mixture.

9. A production method for the biaxially oriented polyester film roll according to 6. or 7., the production method including a step of performing melt extrusion of a polyester raw material resin, a biaxial stretching step, and a step of winding a film after being biaxially stretched into a roll, in which the step of performing melt extrusion of the polyester raw material resin includes a step of supplying raw material resin chips of a carbon-neutral polyester resin obtained using the biomass-derived ethylene glycol to a hopper from above as well as supplying raw material resin chips of a polyester resin composition containing the particles through a pipe having an outlet in the hopper and directly above an extruder, mixing both chips, and melt-extruding the mixture.

Effect of the Invention

According to the present invention, it is possible to provide a biaxially oriented polyester film, which exhibits excellent transparency, is easily subjected to secondary processing such as coating and vapor deposition since the film roll is less likely to wrinkle when the film is wound into a film roll after being produced and there is little adhesion between films in the film roll (so-called blocking phenomenon), exhibits excellent performance after secondary processing, is an environmentally friendly polyester film produced using a carbon-neutral polyester resin obtained using biomass-derived ethylene glycol, and has little variations in physical properties in the machine direction when being wound into a long film roll having a long winding length as well, and a production method therefor.

Particularly in recent years, in order to increase the production efficiency of biaxially oriented polyester films, it is promoted to increase the length in the transverse direction and the length in the machine direction of the biaxially oriented polyester film roll (hereinafter referred to as master roll), which is first wound after the stretching step, but it is possible to obtain a biaxially oriented polyester film, which causes less wrinkling and blocking when being wound into such a film roll having a large size, is easily subjected to secondary processing, and also satisfies the performance after secondary processing, for example, the gas barrier properties of the vapor-deposited film.

The same applies to the film roll obtained by slitting and dividing the master roll into small portions.

MODE FOR CARRYING OUT THE INVENTION

Figure 1:
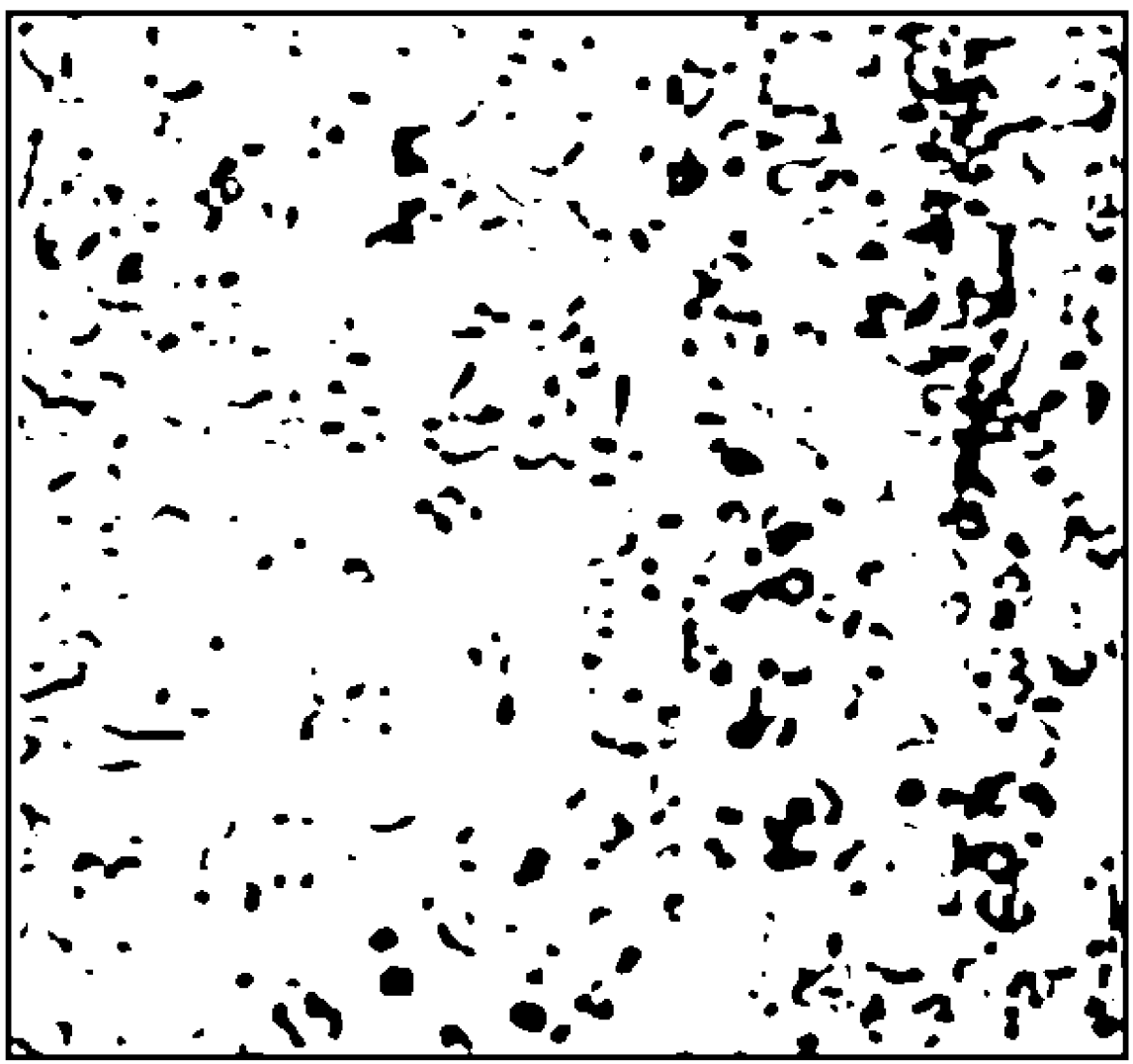
FIG. 1 is a photograph of a film surface in a state in which a strongly charged portion on a surface of a film unwound from a film roll is visualized by a charge distribution determining toner. Static marks are observed.
Figure 2:
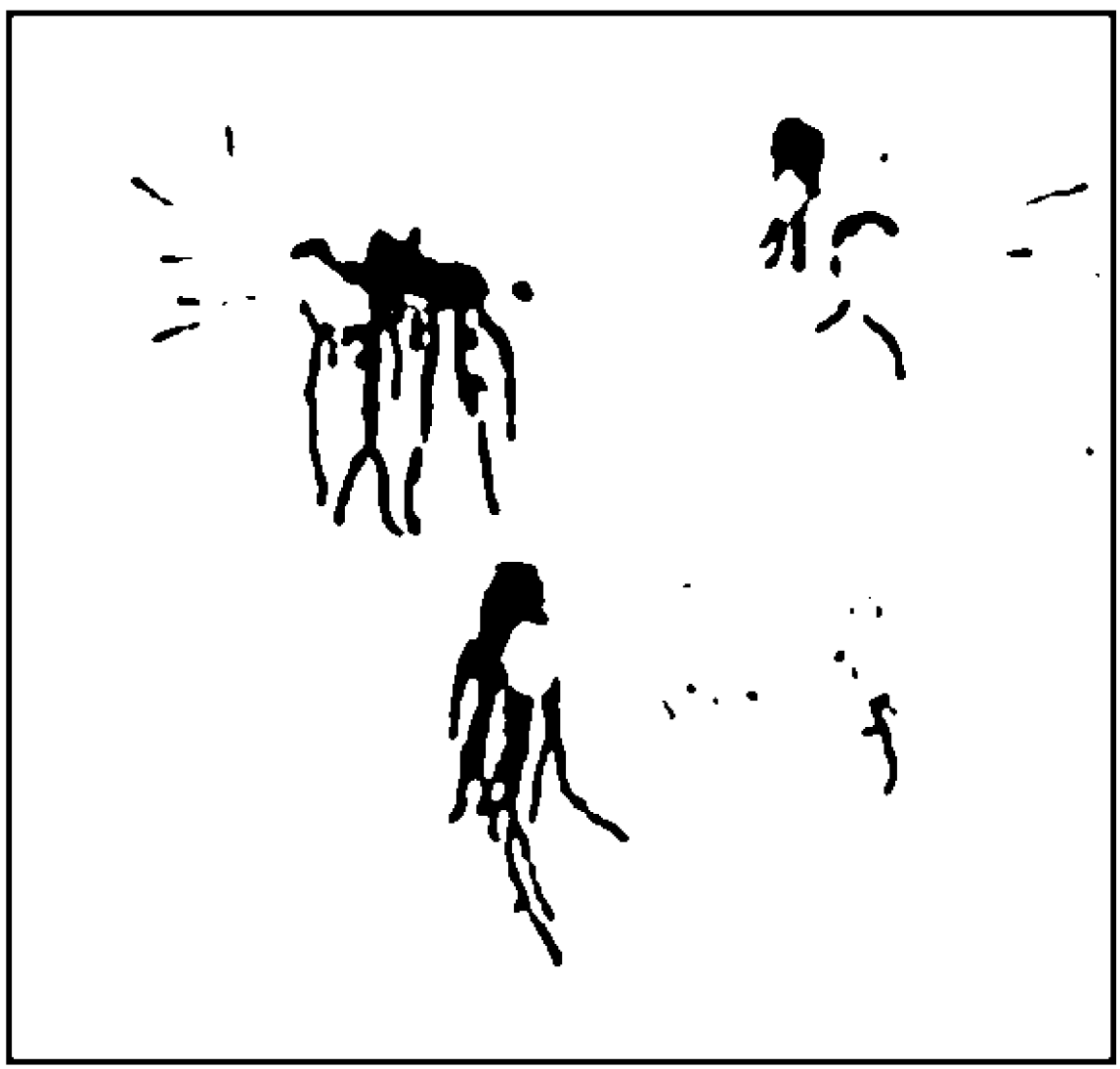
FIG. 2 is a photograph of a film surface in a state in which a portion having a discharge mark on a surface of a film unwound from a film roll is visualized by a charge distribution determining toner. Static mark discharge marks are observed.
Figure 3:
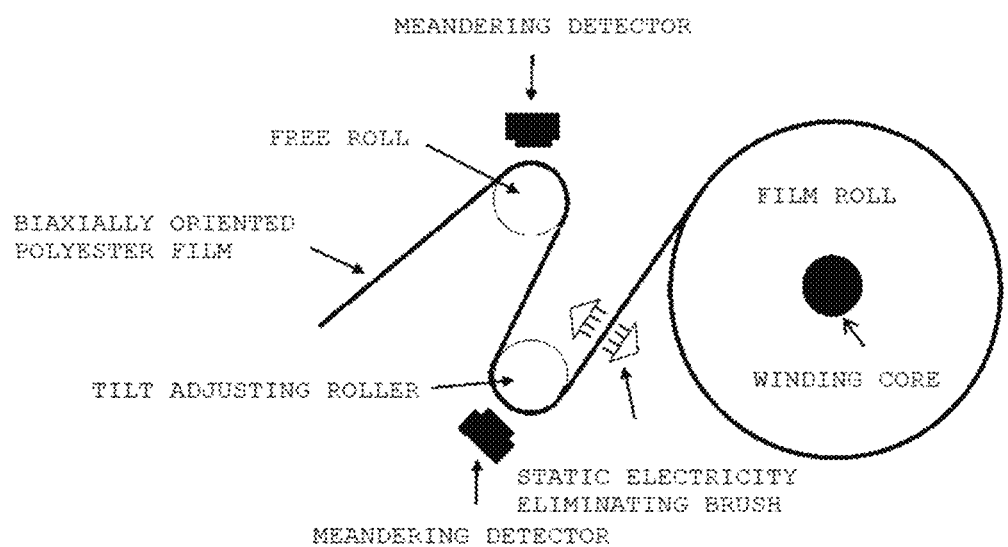
FIG. 3 is a diagram illustrating the disposition of a biaxially oriented polyester film being unwound, a film roll, a static electricity eliminating brush, and a meandering preventing apparatus.

Hereinafter, the present invention will be described in detail.

[Polyester Resin Derived from Biomass]

The biaxially oriented polyester film according to the present invention is preferably composed of the following biomass-derived ethylene glycol and fossil fuel-derived dicarboxylic acid units. By using a polyester resin composed of biomass-derived ethylene glycol and fossil fuel-derived dicarboxylic acid units, it is possible to increase the content of biomass-derived carbon (hereinafter referred to as "biomass degree" in some cases) in the film and obtain a carbon-neutral, environmentally friendly film.

Biomass-derived ethylene glycol is one produced using ethanol (biomass ethanol), which is produced using biomass as a raw material, as a raw material. Biomass-derived ethylene glycol can be obtained by, for example, a method in which biomass ethanol is converted into ethylene glycol via ethylene oxide by a conventionally known method. Commercially available biomass ethylene glycol may be used.

For the dicarboxylic acid units of polyester, dicarboxylic acids derived from fossil fuels are used. As dicarboxylic acids, aromatic dicarboxylic acids, aliphatic dicarboxylic acids, and derivatives thereof can be used without limitation. Examples of aromatic dicarboxylic acids include terephthalic acid and isophthalic acid, examples of derivatives of aromatic dicarboxylic acids include lower alkyl esters of aromatic dicarboxylic acids, specifically methyl esters, ethyl esters, propyl esters and butyl esters. Among these, terephthalic acid is preferable, and dimethyl terephthalate is preferable as an aromatic dicarboxylic acid derivative.

Specific examples of aliphatic dicarboxylic acids include linear or alicyclic dicarboxylic acids usually having 2 to 40 carbon atoms, such as oxalic acid, succinic acid, glutaric acid, adipic acid, sebacic acid, dodecanedioic acid, dimer acid and cyclohexanedicarboxylic acid. Examples of derivatives of aliphatic dicarboxylic acids include lower alkyl esters such as methyl esters, ethyl esters, propyl esters and butyl esters of the aliphatic dicarboxylic acids, and for example, cyclic acid anhydrides of the aliphatic dicarboxylic acids such as succinic anhydride. Among these, adipic acid, succinic acid, dimer acid, or any mixture thereof is preferable, and those containing succinic acid as a main component are particularly preferable. As derivatives of aliphatic dicarboxylic acids, methyl esters of adipic acid and succinic acid or mixtures thereof are preferable.

These dicarboxylic acids can be used singly or in mixture of two or more kinds thereof.

The carbon-neutral polyester resin, which is produced using biomass-derived ethylene glycol, used in the present invention can be obtained by a conventionally known method in which polycondensation of the diol unit and dicarboxylic acid unit described above is performed. Specifically, the carbon-neutral polyester resin can be produced by a general method of melt polymerization in which an esterification reaction and/or a transesterification reaction of the dicarboxylic acid component and the diol component is performed and then a polycondensation reaction is performed under reduced pressure, and a known solution heating dehydration condensation method using an organic solvent.

Various additives may be added in the polyester production process or to the produced polyester as long as the properties of polyester are not impaired, and for example, plasticizers, ultraviolet stabilizers, coloring inhibitors, matting agents, deodorants, flame retardants, weathering agents, anti-static agents, thread friction reducing agents, release agents, antioxidants, ion exchangers, coloring pigments and the like can be added.

[Polyester Resin Composition]

The biaxially oriented polyester film in the present invention is formed of a polyester resin composition containing the following polyester resin as a main component.

The polyester resin constituting the biaxially oriented polyester film of the present invention is a polymer synthesized from a dicarboxylic acid or an ester-forming derivative thereof and a diol or an ester-forming derivative thereof. Examples thereof include polyethylene terephthalate, polybutylene terephthalate, and polyethylene-2,6-naphthalate, and polyethylene terephthalate is preferable from the viewpoint of mechanical characteristics, heat resistance, cost and the like.

The main component here means one of which the content rate in the polyester resin composition is 80% by weight or more, and the content rate is preferably 90% by weight or more, more preferably 95% by weight or more, most preferably 98% by weight or more.

Other components may be copolymerized with these polyester resins as long as the object of the present invention is not impaired. Specifically, as the copolymerization components, examples of the dicarboxylic acid component include isophthalic acid, naphthalenedicarboxylic acid, 4,4-biphenyldicarboxylic acid, adipic acid, sebacic acid, and any ester-forming derivative thereof. Examples of the diol component include diethylene glycol, hexamethylene glycol, neopentyl glycol, and cyclohexanedimethanol. Examples of the diol component also include polyoxyalkylene glycols such as polyethylene glycol and polypropylene glycol. The amount of copolymerization is preferably 10 mol % or less, more preferably 5 mol % or less, most preferably 3 mol % or less per constituent repeating unit.

Examples of the method for producing the polyester resin constituting the biaxially oriented polyester film of the present invention include a method in which an esterification or transesterification reaction is first conducted according to a conventional method using the above-mentioned dicarboxylic acid or an ester-forming derivative thereof and the above-mentioned diol or an ester-forming derivative thereof as main starting materials and then a polycondensation reaction is conducted at a high temperature and a reduced pressure.

The intrinsic viscosity of the polyester resin constituting the biaxially oriented polyester film of the present invention is preferably in a range of 0.50 to 0.9 dl/g, more preferably in a range of 0.55 to 0.8 dl/g from the viewpoint of film formability and recycling properties.

In order to ensure that at least one surface of the biaxially oriented polyester film of the present invention meets all of the following requirements (1) to (3), it is preferable that the polyester resin composition in the present invention contains at least one kind of particles selected from the group consisting of inorganic particles, organic particles, and particles composed of a mixture thereof.

(1) The number of fine protrusions each having a height of less than 3 nm per area of $4\times10^{-12}$ m$^2$ is 250 or more.

(2) a number of fine protrusions each having a height of 3 nm or more per area of $4\times10^{-12}$ m$^2$ is 300 or more and 600 or less; and (3) an arithmetic mean height Sa is 0.010 µm or more and 0.025 µm or less.

Examples of the inorganic particles used include particles formed of silica (silicon oxide), alumina (aluminum oxide), titanium dioxide, calcium carbonate, kaolin, and barium sulfate.

Examples of the organic particles include acrylic resin particles, melamine resin particles, silicone resin particles, and particles formed of crosslinked polystyrene. Among these, particles formed of silica (silicon oxide), calcium carbonate, or alumina (aluminum oxide), or particles formed of polymethacrylate, polymethylacrylate, or derivatives thereof are preferable, and particles formed of silica (silicon oxide) or calcium carbonate are more preferable, and inorganic particles formed of silica (silicon oxide) are particularly preferable.

The particle size distribution of the particles used in the present invention is preferably monodisperse.

The shape of the inorganic fine particles is not particularly limited, but as the shape is closer to a sphere, the number of fine protrusions each having a height of less than 3 nm can be increased without changing the number of fine protrusions each having a height of 3 nm or more and the arithmetic mean height Sa so much.

The weight average particle size of the particles in the present invention measured using a Coulter counter is preferably in a range of 0.8 to 1.8 µm.

When the weight average particle size of the particles is 0.8 µm or more, the number of fine protrusions each having a height of less than 3 nm and the arithmetic mean height Sa are likely to be set to the lower limit values of (1) and (3) or more, respectively.

When the weight average particle size of the particles is 1.8 µm or less, it is easy to set the arithmetic mean height Sa to the upper limit of (3) or less and this is also suitable for setting the number of fine protrusions each having a height of less than 3 nm to the lower limit of (1) or more.

The lower limit of the content of particles in the polyester resin composition (masterbatch) containing particles in the present invention is 1,000 ppm by weight, more preferably 1,300 ppm by weight, particularly preferably 1,400 ppm by mass. When the particle content is 1,000 ppm by weight or more, it is easy to set the number of fine protrusions each having a height of less than 3 nm and the number of fine protrusions each having a height of 3 nm or more to the lower limits of (1) and (2) or more, respectively.

The upper limit of the content of particles is preferably 3,000 ppm by weight, more preferably 2,500 ppm by weight, still more preferably 2,200 ppm by weight, particularly preferably 1,800 ppm by weight.

The concentration of the inorganic particles in the masterbatch is preferably 7,000 to 100,000 ppm, more preferably 8,000 to 80,000 ppm, particularly preferably 9,000 to 50,000 ppm. When the concentration of the inorganic particles in the masterbatch is less than 7,000 ppm, the addition ratio of the masterbatch containing the inorganic particles increases, the proportion of polyester resin composed of biomass-derived ethylene glycol and fossil fuel-derived dicarboxylic acid units, which is the main raw material, decreases, and inexpensive resin and resin properties for environmental consideration and the like are not effectively acquired. When the concentration of the inorganic particles in the masterbatch is more than 100,000 ppm, the raw material ratio greatly fluctuates in the machine direction because of segregation of the raw materials, and thus the variation in the machine direction of the obtained film is likely to be large.

As the method for blending the particles into the polyester resin composition in the present invention, for example, the particles can be added at any stage of the stage of esterification for production of polyester-based resin, the stage after the termination of transesterification reaction, or the stage before the start of polycondensation reaction, but it is preferable to add the particles as a slurry dispersed in ethylene glycol or the like and to conduct the polycondensation reaction.

It is also preferable to blend the particles by a method in which a slurry of particles dispersed in ethylene glycol, water or the like is blended with a polyester-based resin raw material using a kneading extruder with a vent or a method in which the dried particles are blended with a polyester-based resin raw material using a kneading extruder.

In the step of mixing the particles with the polyester-based resin raw material, it is preferable to decrease the aggregates of particles as much as possible in order to stably obtain the desired surface state, but the influence can be diminished by adjusting the conditions in the step of forming the biaxially oriented polyester film after the mixing step.

The polyester resin composition in the present invention may contain a small amount of other polymers, antioxidants, heat stabilizers, anti-static agents, ultraviolet absorbers, plasticizers, pigments or other additives and the like as long as the object of the present invention is not impaired.

In the polyester film of the present invention, the lower limit of the content rate of the carbon-neutral polyester resin obtained using biomass-derived ethylene glycol with respect to the total amount is preferably 50% by weight, more preferably 70% by weight, still more preferably 90% by mass, particularly preferably 100% by weight. When the content rate is less than 50% by weight, the content rate is poor in terms of utilization of carbon-neutral polyester resin and it is not so preferable in terms of contribution to environmental protection. A carbon-neutral polyester resin obtained using biomass-derived ethylene glycol can also be used as a masterbatch (resin contained at a high concentration) to be used in the case of adding lubricants such as inorganic particles and additives to improve the functions as a film.

In the carbon-neutral polyester resin obtained using biomass-derived ethylene glycol obtained as described above, the lower limit of the biomass degree by radiocarbon (C14) measurement is preferably 10%, more preferably 13% from the viewpoint of reducing environmental load. When the biomass degree is less than the above, the effect as a carbon offset material may be small in terms of reducing the environmental load. The upper limit of the biomass degree is preferably 100%, more preferably 20%. For example, polyethylene terephthalate theoretically has a biomass degree of 20% when only ethylene glycol is one derived from plants, and terephthalic acid is also required to be one derived from plants in order to increase the biomass degree to more than 20%, and this leads to an increase in cost.

It is known that the C14 content in plants that grow by taking in carbon dioxide from the atmosphere, for example, maize is also about 105.5 pMC since carbon dioxide in the atmosphere contains C14 at a certain proportion (105.5 pMC). It is also known that fossil fuels contain almost no C14. Therefore, by measuring the proportion of C14 included in the total carbon atoms in the polyester, the proportion of biomass-derived carbon can be calculated. For example, in the case of polyethylene terephthalate, since polyethylene terephthalate is obtained by polymerizing ethylene glycol containing 2 carbon atoms and terephthalic acid containing 8 carbon atoms at a molar ratio of 1:1, the biomass degree in the polyester is 20% in the case of using only biomass-derived ethylene glycol as the ethylene glycol.

[Production Method for Biaxially Oriented Polyester Film]

The biaxially oriented polyester film of the present invention can be obtained by, for example, supplying and mixing the carbon-neutral polyester resin chips obtained using biomass-derived ethylene glycol and chips of a polyester resin composition containing a polyester resin as a main component in an extruder equipped in a hopper, and then melt-extruding the mixture using the extruder to form an un-stretched sheet, and stretching the un-stretched sheet.

Suitable examples are described below, but the production method is not limited thereto.

The film of the present invention may have a single-layer structure having at least one layer, or may have a laminated structure having two or more layers. The film of the present invention may have two layers, three layers, four layers, or five layers. In the case of two layers, the film is composed of laminated portion/base layer portion, and in the case of three layers, the film is composed of a laminated portion (A)/base layer portion/laminated portion (B). In the case of three layers, the laminated portion (A) and the laminated portion (B) may have the same composition and configuration or may have different compositions and, for example, a configuration of a particle-free layer/base layer portion/particle-containing layer. The laminated portion (A) and the laminated portion (B) may have substantially the same thickness or different thicknesses. Preferably, it is desirable that the laminated portion (A) and the laminated portion (B) are designed to have the same composition for easy production.

Next, in the film of the present invention, it is preferable that at least one layer of each of the above-mentioned layers constituting the film is biaxially oriented. Among the laminated structures having two or more layers, it is particularly preferable that all the layers are biaxially oriented. It is not so preferable that all layers are non-oriented or uniaxially oriented since it is difficult to use the film for body-wrapping labels.

When the resin chips, which are raw materials, are mixed, it is preferable that the carbon-neutral polyester resin chips obtained using biomass-derived ethylene glycol are supplied to the hopper from above as well as the chips of the polyester resin composition are supplied through the pipe (hereinafter, referred to as an inner pipe in some cases) having an outlet in the hopper and directly above the extruder, both chips are mixed, and the mixture is melt-extruded. When the carbon-neutral polyester resin chips obtained using biomass-derived ethylene glycol and the chips of the polyester resin composition are supplied to the hopper above the extruder in a mixed state, there is a possibility that the resin chips having different specific gravities and chip shapes cause segregation of raw materials in the hopper. In particular, there is a high concern that raw material segregation occurs at the place (the part that is slanted) where the inner wall of the hopper is not vertical. However, when the polyester resin composition is directly supplied to the directly upper part of the extruder in the hopper through the inner pipe, the raw material segregation can be diminished and the polyester film can be stably industrially produced although the resin chips have different specific gravities and chip shapes.

Figure 4:
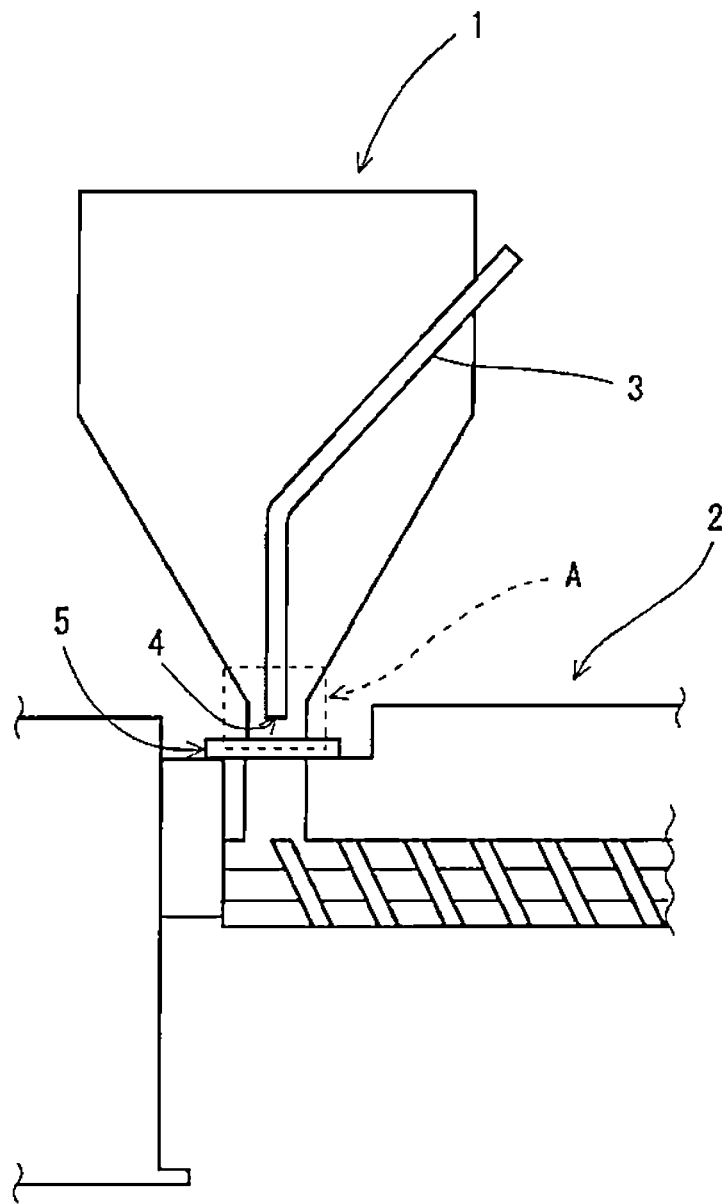
FIG. 4 is a schematic diagram for explaining an example of a method for mixing resin chips for producing a biaxially oriented polyester film of the present invention.
Figure 5:
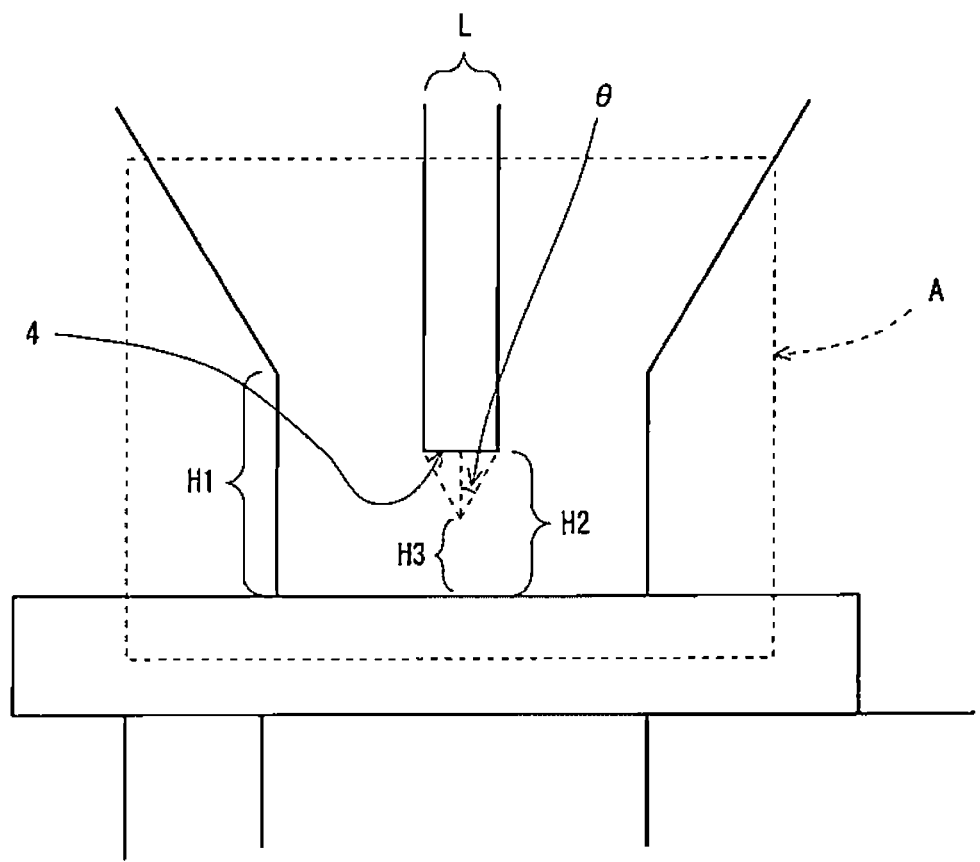
FIG. 5 is a partially enlarged view of FIG. 4.

An example of a specific mixing procedure is illustrated in FIG. 4. FIG. 4 is a schematic diagram illustrating an example of the relation between an extruder 2 equipped with a hopper 1 and an inner pipe 3. As illustrated in FIG. 4, resins other than the carbon-neutral polyester resin chips obtained using biomass-derived ethylene glycol, which are a main raw material of the polyester film of the present invention, are supplied through the inner pipe 3, and the chips of the polyester resin composition are supplied from the upper part of the hopper 1. Since an outlet 4 of the inner pipe 3 is directly above the extruder (to be exact, directly above a resin supply port 5 of the extruder 2), the mixing ratio of the raw materials can be kept constant.

When the carbon-neutral polyester resin obtained using biomass-derived ethylene glycol and the polyester resin composition are melt-extruded, it is preferable to perform drying using a dryer such as a hopper dryer or a paddle dryer or a vacuum dryer. The carbon-neutral polyester resin obtained using biomass-derived ethylene glycol and the polyester resin composition are dried in this way, and then melted at a temperature that is the melting point of the polyester resin or higher and is 200° C. to 300° C. and extruded into a film using the extruder. Alternatively, the polyester resin, particles, and if necessary, additives may be sent through separate extruders, merged, then mixed and melted, and extruded into a sheet.

When the molten resin composition is extruded, an arbitrary existing method such as a T-die method and a tubular method can be adopted.

Thereafter, an un-stretched sheet can be obtained by rapidly cooling the sheet-shaped molten polyester resin after extrusion. As the method for rapidly cooling the molten polyester resin, a method in which a substantially un-oriented resin sheet is obtained by casting the molten polyester resin onto a rotating drum through a mouthpiece and rapidly cooling and solidifying the cast polyester resin can be suitably adopted. The temperature of the rotating drum is preferably set to 40° C. or less.

Furthermore, the obtained un-stretched sheet is subjected to the combination of the following steps such as a stretching step in the machine direction and the transverse direction, a heat setting step, and a heat relaxation step, whereby it is possible to obtain the biaxially oriented polyester film of the present invention.

This will be described in detail below. The machine direction means the direction in which the un-stretched sheet travels, and the transverse direction means the direction perpendicular to the machine direction.

The stretching method can be simultaneous biaxial stretching in which stretching in the machine direction and stretching in the transverse direction are performed at the same time or sequential biaxial stretching in which stretching in either of the machine direction or the transverse direction is first performed, but sequential biaxial stretching is most preferable from the viewpoint of high film forming speed and high productivity and the viewpoint of excellent thickness uniformity of the finally obtained biaxially oriented polyester film.

The film forming speed here means the traveling speed (m/min) of the biaxially oriented polyester film when wound into a master roll after the stretching step.

The temperature during stretching of the un-stretched sheet in the machine direction is preferably in a range of (Tg+15) to (Tg+55)° C. with the glass transition temperature (hereinafter, Tg) of the polyester resin as an index, and the stretch ratio is in a range of 4.2 to 4.7 times.

It is preferable that the temperature during stretching is (Tg+55)° C. or less and the stretch ratio is 4.2 times or more since it is easy to set the number of fine protrusions each having a height of less than 3 nm to the lower limit of (1) or more, the molecular orientations in the machine direction and the transverse direction are well balanced and the difference between the physical properties in the machine direction and the physical properties in the transverse direction is small. This is preferable since the flatness of the obtained biaxially oriented polyester film is also favorable.

Meanwhile, when the temperature during stretching in the machine direction is (Tg+15)° C. or more and the stretch ratio is 4.7 times or less, it is easy to set the arithmetic mean height Sa to the upper limit of (3) or less. This is preferable since the tensile stress (bowing phenomenon) generated in the direction opposite to the traveling direction of the film in the heat relaxation step does not become too large.

In stretching in the machine direction, the difference in physical properties in the film transverse direction can be further diminished in a method in which stretching is performed not by one stage but in a manner divided into two, three, or four or more stages between a plurality of rolls since the stretch ratio in the machine direction can be increased without increasing the stretching speed too much. Two-stage or three-stage stretching is preferable from the viewpoint of effect, equipment, and cost.

After the film obtained by stretching the un-stretched sheet in the machine direction has been subjected to surface treatment such as corona treatment and plasma treatment, if necessary, a resin dispersion or a resin solution can be applied to at least one surface of the film in order to impart functions such as easy slipperiness, easy adhesive property, and antistatic property.

In a case where the film obtained by stretching the un-stretched sheet in the machine direction is stretched in the transverse direction, the film can be stretched in the transverse direction by guiding the film to a tenter apparatus, holding both ends of the film obtained by stretching the un-stretched sheet in the machine direction with clips, heating the film to a predetermined temperature with hot air, and then increasing the distance between the clips while transporting the film in the machine direction.

It is preferable that the temperature during stretching in the transverse direction is (Tg+5)° C. or more since it is easy to set the arithmetic mean height Sa to the upper limit value of (3) and breakage is less likely to occur during stretching.

It is preferable that the temperature during stretching is (Tg+40)° C. or less since it is easy to set the number of fine protrusions each having a height of less than 3 nm to the lower limit of (1) or more, uniform stretching in the transverse direction is likely to be performed, thickness unevenness in the transverse direction is less likely to increase, and the variation in the winding hardness on the film roll surface in the transverse direction is less likely to be large.

The temperature during stretching is more preferably (Tg+8)° C. or more and (Tg+37)° C. or less, still more preferably (Tg+11)° C. or more and (Tg+34)° C. or less.

The stretch ratio in the transverse direction of the film obtained by stretching the un-stretched sheet in the machine direction is preferably 4.0 times or more and 6 times or less.

It is preferable that the stretch ratio in the transverse direction is 4.0 times or more since it is easy to set the number of fine protrusions each having a height of less than 3 nm to the lower limit of (1) or more, it is easy to obtain a high yield in terms of mass balance, and the mechanical strength does not decrease as well as the thickness unevenness in the transverse direction is less likely to increase and the variation in the winding hardness of the film roll in the transverse direction is less likely to be caused. The stretch in the transverse direction is more preferably 4.1 times or more, still more preferably 4.2 times or more.

It is preferable that the stretch ratio in the transverse direction is 6 times or less since it is easy to set the arithmetic mean height Sa to the upper limit value of (3) or less and breakage is less likely to occur during stretching and film formation.

A heat setting step is performed subsequently to the stretching step in the transverse direction, and the heat setting temperature of the film obtained by stretching an un-stretched sheet in the machine direction and stretching the film obtained in the transverse direction is preferably 240° C. or more and 250° C. or less.

It is preferable that the heat setting temperature is 240° C. or more since it is easy to set the number of fine protrusions each having a height of less than 3 nm to the lower limit of (1) or more, the heat shrinkage rate does not become too high in both the machine direction and the transverse direction, and the thermal dimensional stability during the vapor deposition processing is improved.

Meanwhile, it is preferable that the heat setting temperature is 250° C. or less since bowing is less likely to increase.

The heat relaxation treatment step is further performed, but the heat relaxation treatment step may be performed separately from the heat setting step after the heat setting step has been performed or may be performed at the same time as the heat setting step. The relaxation rate in the film transverse direction in the heat relaxation treatment step is preferably 4% or more and 8% or less.

It is preferable that the relaxation rate is 4% or more since the heat shrinkage rate in the transverse direction of the obtained biaxially oriented polyester film does not increase too high and the dimensional stability during the vapor deposition processing is improved.

Meanwhile, it is preferable that the relaxation rate is 8% or less since the tensile stress (bowing phenomenon) caused in the direction opposite to the traveling direction of the film in the transverse direction center of the film does not increase too high and the thickness unevenness rate in the transverse direction does not increase.

In the heat relaxation treatment step, the film is in a situation to be significantly likely to fluctuate up and down since the binding force in the transverse direction may decrease and the film may loosen by its own weight until the film obtained by stretching an un-stretched sheet in the machine direction and stretching the film in the transverse direction is shrunk by heat relaxation and the film may swell by the accompanying airflow of hot air blown from the nozzles installed above and below the film, and the amounts of changes in the orientation angle and the difference in the oblique heat shrinkage rate of the obtained biaxially stretched polyester film are likely to fluctuate greatly. Examples of the method for diminishing these include keeping the film parallel by adjusting the wind speed of hot air blown from the upper and lower nozzles.

The biaxially oriented polyester film for vapor deposition of the present invention may be subjected to a corona discharge treatment, a glow discharge treatment, a flame treatment, and a surface roughening treatment and also subjected to known anchor coating treatment, printing, decoration, and the like as long as the object of the present invention is not impaired.

The wide biaxially oriented polyester film which has been stretched and formed by the methods described above is wound using a winder apparatus to fabricate a master roll. The width of the master roll is preferably 5000 mm or more and 10000 mm or less. It is preferable that the width of the roll is 5000 mm or more since the cost per film area decreases in the subsequent slitting step, vapor deposition processing, and printing processing.

The winding length of the master roll is preferably 10,000 m or more and 100,000 mm or less. It is preferable that the winding length of the roll is 5,000 m or more since the cost per film area decreases in the subsequent slitting step, vapor deposition processing, and printing processing.

The winding width of the film roll slit from the master roll is preferably 400 mm or more and 3,000 mm or less. It is preferable that the winding width is 400 mm or more in terms of cost since the labor to frequently exchange the film roll in the printing step decreases. It is more preferable as the winding width is wider, but it is preferable that the winding width is 3,000 mm or less since the roll width does not increase too wide, the roll weight does not increase too heavy, and the handleability does not decrease.

The winding length of the film roll is preferably 2,000 m or more and 65,000 m or less. It is preferable that the winding length is 2,000 m or more in terms of cost since the labor to frequently exchange the film roll in the printing step decreases. It is more preferable as the winding length is longer, but it is preferable that the winding length is 65,000 m or less since the roll diameter does not increase too large, the roll weight does not increase too heavy, and the handleability does not decrease.

[Properties of Biaxially Oriented Polyester Film]

It is preferable that at least one surface of the biaxially oriented polyester film formed of a polyester resin composition containing a carbon-neutral polyester resin obtained using biomass-derived ethylene glycol and particles of the present invention meets all of the following requirements (1) to (3). Each of the requirements will be described in detail.

(1) a number of fine protrusions each having a height of less than 3 nm per area of $4 \times 10^{-12}$ m$^2$ is 250 or more and 600 or less;

(2) a number of fine protrusions each having a height of 3 nm or more per area of $4 \times 10^{-12}$ m$^2$ is 300 or more and 600 or less; and (3) an arithmetic mean height Sa is 0.010 μm or more and 0.025 μm or less.

(1) Number of Fine Protrusions Each Having Height of Less than 3 nm Per Area of $4 \times 10^{-12}$ m$^2$ Sine a biaxially oriented polyester film has electrical insulation, static marks, which are locally charged parts, and static mark discharge marks due to the discharge of stored static electricity are likely to be generated by contact with the transport roll, peeling off and the like in the film producing process and processing process, but when the number of fine protrusions each having a height of less than 3 nm per area of $4 \times 10^{-12}$ m$^2$ is 250 or more, static marks and static mark discharge marks decrease, and coating unevenness is less likely to occur after the coating layer is formed, the gas barrier performance of the formed inorganic thin film layer is improved, or the performance after secondary processing is likely to be improved.

It is considered that the reason is because when the number of fine protrusions each having a height of less than 3 nm per area of $4 \times 10^{-12}$ m$^2$ is 250 or more, the area in which the film surface and the metal roll come into contact with each other is extremely small in a case where the film and the metal roll come into contact with each other with a strong force and the high protrusions on the film surface are pushed in the step of transporting and winding the produced film as well, the electric charge amount due to friction is small, and as a result, the static marks and the static mark discharge marks decrease. The number of fine protrusions is still more preferably 300 or more, more preferably 400 or more, particularly preferably 500 or more. This tendency also applies to the friction that occurs when the films come into contact with each other.

The number of fine protrusions each having a height of less than 3 nm does not further improve the slipperiness of the film or decrease the blocking property but has a feature that the number does not adversely affect the gas barrier properties of the inorganic thin film layer formed on the film surface.

When the number of fine protrusions each having a height of less than 3 nm is in a range of 600 or less as well, there are sufficiently few static marks and static mark discharge marks.

(2) Number of Fine Protrusions Each Having Height of 3 nm or More Per Area of $4 \times 10^{-12}$ m$^2$ It is preferable that the number of fine protrusions each having a height of 3 nm or more is 300 or more since the dynamic friction coefficient between the films does not become too small, and static marks, which are locally charged parts, and static mark discharge marks due to the discharge of stored static electricity generated by contact with the transport roll, peeling off and the like in the film producing process or processing process since the biaxially oriented polyester film has electrical insulation can be less likely to be generated. The number of fine protrusions is still more preferably 400 or more, more preferably 500 or more.

When the number of fine protrusions each having a height of 3 nm or more is 600 or less, the gas barrier properties of the formed inorganic thin film layer can be sufficiently obtained.

(3) Arithmetic Mean Height Sa

The arithmetic mean height Sa of at least one surface of the biaxially oriented polyester film of the present invention is preferably 0.010 µm or more and 0.025 µm or less.

It is preferable that the arithmetic mean height Sa is 0.010 µm or more since adhesion (blocking phenomenon) between films in the film roll of the recess portion between the films and between the protrusions formed on the film surface is less likely to occur and the secondary processing of the film can be performed smoothly. The arithmetic mean height Sa is more preferably 0.013 µm or more, more preferably 0.015 µm or more.

It is preferable that the arithmetic mean height Sa is 0.025 µm or less since the haze of the biaxially oriented polyester film, particularly the external haze, decreases and the transparency is excellent. The arithmetic mean height Sa is still more preferably 0.023 µm or less, more preferably 0.020 µm or less, particularly preferably 0.017 µm or less.

The arithmetic mean height Sa of the other film surface is preferably in a similar range.

(Dynamic Friction Coefficient)

The dynamic friction coefficient between one surface of the biaxially oriented polyester film of the present invention and the opposite surface is preferably 0.20 or more and 0.60 or less.

When the dynamic friction coefficient is 0.20 or more, the films do not slip too much, the film roll is less likely to wrinkle when the film roll is wound using a winder apparatus during film production or slitting, and the secondary processability is less likely to decrease. The dynamic friction coefficient is still more preferably 0.30 or more.

When the dynamic friction coefficient is 0.60 or less, the films do not slip too much, the film roll is less likely to wrinkle when the film roll is wound using a winder apparatus during film production or slitting, and the secondary processability is less likely to decrease. The dynamic friction coefficient is still more preferably 0.50 or less, most preferably 0.45 or less.

(Static Friction Coefficient)

The static friction coefficient between one surface of the biaxially oriented polyester film of the present invention and the opposite surface is preferably 0.20 or more and 0.60 or less.

When the dynamic friction coefficient is 0.20 or more, the films do not slip too much, the film roll is less likely to wrinkle when the film roll is wound using a winder apparatus during film production or slitting, and the secondary processability is less likely to decrease. The dynamic friction coefficient is still more preferably 0.30 or more.

When the static friction coefficient is 0.60 or less, the films slip, thus the film roll is less likely to wrinkle when the film roll is wound using a winder apparatus during film production or slitting, and the secondary processability is less likely to decrease. The dynamic friction coefficient is still more preferably 0.50 or less, most preferably 0.45 or less.

(Maximum Height Sz)

The maximum height Sz of the surface meeting all of (1) to (3) of the biaxially oriented polyester film of the present invention is preferably 0.5 µm or more and 2.0 µm or less.

When the maximum height Sz is 0.5 µm or more, the amount of air entrained between the films in contact with each other is less likely to increase when the master roll is wound or when the master roll is slit and the biaxially oriented polyester film is wound around the winding core, and the film is less stretched or deformed. The film in the roll is less likely to loosen after the air in the film roll is released. When the weight average particle size of the particles contained in the polyester resin is 0.8 µm or more, it is easy to set the maximum height Sz to 0.5 µm or more.

When the maximum height Sz is 2.0 µm or less, the coating film and the inorganic thin film layer after the secondary processing are less missing or defective on the surface of the biaxially oriented polyester film. When the temperature during stretching in the machine direction is (Tg+40)° C. or less or the stretch ratio is 4.2 times or more, it is easy to set the maximum height Sz to 2.0 µm or less.

The same applies to the maximum height Sz of the other film surface.

(External Haze)

The external haze of the biaxially oriented polyester film of the present invention is preferably 1.8% or less. It is preferable that the external haze is 1.8% or less since the smoothness of the film surface is less likely to be impaired, charging due to contact with the transport roll, peeling off and the like is less likely to occur in the film producing process, and quality defects such as static marks and static mark discharge marks due to charging are less likely to be generated. The external haze is still more preferably 1.6% or less, more preferably 1.4% or less, particularly preferably 1.2% or less, most preferably 1.0% or less.

(Internal Haze)

The internal haze of the biaxially oriented polyester film of the present invention is preferably 2.5% or less. It is preferable that the internal haze is 2.5% or less since the transparency is less likely to decrease. The internal haze is still more preferably 2.0% or less, more preferably 1.8% or less, particularly preferably 1.6% or less.

(Wetting Tension)

One surface of the biaxially oriented polyester film of the present invention may be subjected to surface modification by a surface treatment such as low temperature plasma treatment or corona discharge treatment.

At this time, the wetting tension of the surface meeting all of (1) to (3) of the biaxially oriented polyester film of the present invention is preferably 50 mN/m or more, more preferably 52 mN/m or more.

There is no particular upper limit, but the wetting tension in a range of 55 mN/m or less is sufficient for the performance after secondary processing such as coating and vapor-deposited thin film.

(Film Thickness)

The film thickness of the biaxially oriented polyester film of the present invention is preferably 5 to 40 μm. It is preferable that the film thickness is 5 μm or more since the strength and firmness as a film do not decrease and the film roll is less likely to wrinkle when the film is wound using a winder apparatus. Meanwhile, when the film thickness is in a range of 40 μm or less, the strength and firmness is sufficiently obtained, and it is preferable to decrease the film thickness from the viewpoint of cost. The film thickness is more preferably 8 to 30 μm, particularly preferably 9 μm to 20 μm.

(Biomass Degree of Film)

In the biaxially oriented polyester film of the present invention, the content of biomass-derived carbon by radiocarbon (C14) measurement is 10% to 18% with respect to total carbon in the polyester film. When the biomass degree in the environmentally friendly polyester film produced using a carbon-neutral polyester resin obtained using biomass-derived ethylene glycol is less than 10%, the effect as a carbon offset material is poor. It is preferable that the biomass degree in the carbon-neutral polyester resin obtained using biomass-derived ethylene glycol is close to 20%, but the actual upper limit is 19% because of problems in the film production process and from the perspective of physical properties and cost.

(Vapor-Deposited Film)

A gas barrier layer such as an inorganic thin film layer or a metal foil such as an aluminum foil can be provided on at least one surface meeting all of the following (1) to (3) of the biaxially oriented polyester film of the present invention.

(1) a number of fine protrusions each having a height of less than 3 nm per area of $4 \times 10^{-12}$ m$^2$ is 250 or more and 600 or less;

(2) a number of fine protrusions each having a height of 3 nm or more per area of $4 \times 10^{-12}$ m$^2$ is 300 or more and 600 or less; and (3) an arithmetic mean height Sa is 0.010 μm or more and 0.025 μm or less.

The inorganic thin film layer is a thin film formed of a metal or an inorganic oxide. The material for forming the inorganic thin film layer is not particularly limited as long as the material can be formed into a thin film. From the viewpoint of gas barrier properties, preferable examples thereof include inorganic oxides such as silicon oxide (silica), aluminum oxide (alumina), and a mixture of silicon oxide and aluminum oxide. Particularly, a composite oxide of silicon oxide and aluminum oxide is preferable from the viewpoint of achieving both flexibility and denseness of the thin film layer and the viewpoint of transparency.

In the composite oxide of silicon oxide and aluminum oxide, with regard to the mixing ratio of silicon oxide to aluminum oxide, Al is preferably in a range of 20 to 70% in terms of the weight ratio of metal contents. When the Al concentration is less than 20%, the water vapor gas barrier properties may decrease. Meanwhile, when the Al concentration is more than 70%, the inorganic thin film layer tends to be hard, the film may be broken during secondary processing such as printing and lamination, and the gas barrier properties may decrease. The silicon oxide used herein is various silicon oxides such as SiO and $SiO_2$ or a mixture thereof, and the aluminum oxide used herein is various aluminum oxides such as AlO and $Al_2O_3$ or a mixture thereof.

The thickness of the inorganic thin film layer is usually 1 to 100 nm, preferably 5 to 50 nm. When the thickness of the inorganic thin film layer is less than 1 nm, it may be difficult to obtain satisfactory gas barrier properties. On the other hand, even when the thickness is excessively thicker than 100 nm, the effect of improving the gas barrier properties along with excessive thickness is not obtained, and it is rather disadvantageous from the viewpoint of flex resistance and production cost.

The method for forming the inorganic thin film layer is not particularly limited, and known vapor deposition methods, for example, physical vapor deposition methods (PVD methods) such as a vacuum vapor deposition method, a sputtering method, and an ion plating method, or chemical vapor deposition methods (CVD methods) may be appropriately adopted. Hereinafter, a typical method for forming the inorganic thin film layer will be described by taking a silicon oxide-aluminum oxide based thin film as an example. For example, in the case of adopting the vacuum vapor deposition method, a mixture of $SiO_2$ and $Al_2O_3$, a mixture of $SiO_2$ and Al, or the like is preferably used as a vapor deposition raw material. Usually, particles are used as these vapor deposition raw materials. In this case, the size of each particle is desirably a size that does not change the pressure during vapor deposition, and the preferable particle size is 1 mm to 5 mm. For heating, systems such as resistive heating, high frequency induction heating, electron beam heating, and laser heating can be adopted. It is also possible to adopt reactive vapor deposition by introducing oxygen, nitrogen, hydrogen, argon, carbon dioxide gas, water vapor or the like as a reaction gas or using a means such as ozone addition or ion assist. The film forming conditions can also be arbitrarily changed so that a bias is applied to the body to be vapor-deposited (laminated film to be subjected to vapor deposition) or the body to be vapor-deposited is heated or cooled. The vapor deposition materials, the reaction gases, the application of a bias to the body to be vapor-deposited, the heating/cooling, and the like can be similarly changed even when a sputtering method and a CVD method are adopted. A printing layer may be laminated on the inorganic thin film layer.

In the present invention, it is preferable to provide a protective layer on the gas barrier layer. The gas barrier layer formed of a metal oxide is not a completely dense film and has dotted microscopic deficient moieties. By applying a specific resin composition for protective layer to be described later onto the inorganic thin film layer to form a protective layer, a resin in the resin composition for protective layer invades the deficient moieties of the inorganic thin film layer, and as a result, an effect of stabilizing the gas barrier properties is obtained. Additionally, by using a material exhibiting gas barrier properties in the protective layer itself as well, the gas barrier performance of the laminated film can also be greatly improved.

Examples of the protective layer include protective layers obtained by adding curing agents such as epoxy-based curing agents, isocyanate-based curing agents, and melamine-based curing agents to resins such as urethane-based resins, polyester-based resins, acrylic resins, titanium-based resins, isocyanate-based resins, imine-based resins, and polybutadiene-based resins. Examples of the solvating medium (solvent) used for forming the protective layer include aromatic solvents such as benzene and toluene; alcohol-based solvents such as methanol and ethanol; ketone-based solvents such as acetone and methyl ethyl ketone; ester-based solvents such as ethyl acetate and butyl acetate; and polyhydric alcohol derivatives such as ethylene glycol monomethyl ether.

The urethane resin is preferable since the polar groups of the urethane bond interact with the inorganic thin film layer, the urethane resin also exhibits flexibility due to the presence of amorphous moieties, and thus the damage to the inorganic thin film layer can be suppressed even when a bending load is applied.

The acid value of urethane resin is preferably in a range of 10 to 60 mg KOH/g. The acid value of urethane resin is more preferably in a range of 15 to 55 mg KOH/g, still more preferably in a range of 20 to 50 mg KOH/g. When the acid value of the urethane resin is in the above range, the liquid stability is improved when an aqueous dispersion is prepared, the protective layer can be uniformly deposited on the highly polar inorganic thin film, and thus the coating appearance is favorable.

The urethane resin has a glass transition temperature (Tg) of preferably 80° C. or more, more preferably 90° C. or more. By setting Tg to 80° C. or more, swelling of the protective layer due to molecular motion in the heat-moisture treatment process (temperature rise to temperature retention to temperature fall) can be diminished.

As the urethane resin, it is more preferable to use a urethane resin containing aromatic or aromatic-aliphatic diisocyanate components as a main component from the viewpoint of improving the gas barrier properties.

Among these, it is particularly preferable to contain a meta-xylylene diisocyanate component. By using the resin, the cohesive force of the urethane bond can be further increased by the stacking effect between the aromatic rings, and as a result, favorable gas barrier properties are obtained.

In the present invention, the proportion of aromatic or aromatic-aliphatic diisocyanates in the urethane resin is preferably set to be in a range of 50 mol % or more (50 to 100 mol %) in 100 mol % of polyisocyanate component (F). The proportion of the total amount of aromatic or aromatic-aliphatic diisocyanates is preferably 60 to 100 mol %, more preferably 70 to 100 mol %, still more preferably 80 to 100 mol %. As such a resin, the "TAKELAC (registered trademark) WPB" series commercially available from Mitsui Chemicals, Inc. can be suitably used. When the proportion of the total amount of aromatic or aromatic-aliphatic diisocyanates is less than 50 mol %, there is a possibility that favorable gas barrier properties are not obtained.

The urethane resin preferably has a carboxylic acid group (carboxyl group) from the viewpoint of improving the affinity for the inorganic thin film layer. In order to introduce a carboxylic acid (salt) group into the urethane resin, for example, a polyol compound having a carboxylic acid group such as dimethylolpropionic acid or dimethylolbutanoic acid as a polyol component may be introduced as a copolymerization component. When a carboxylic acid group-containing urethane resin is synthesized and then neutralized with a salt forming agent, a urethane resin in the form of an aqueous dispersion can be obtained. Specific examples of the salt forming agent include trialkylamines such as ammonia, trimethylamine, triethylamine, triisopropylamine, tri-n-propylamine, and tri-n-butylamine; N-alkylmorpholines such as N-methylmorpholine and N-ethylmorpholine; and N-dialkylalkanolamines such as N-dimethylethanolamine and N-diethylethanolamine. These may be used singly or two or more kinds thereof may be used concurrently.

(Laminated Body)

The biaxially oriented polyester film of the present invention may be used as a substrate film, and layers of other materials may be laminated thereon to form a laminated body. As the lamination method, the layer formed of another material can be bonded to the biaxially oriented polyester film after fabrication or during formation of the film.

For example, one obtained by further forming a heat-sealable resin layer called a sealant on the biaxially oriented polyester film of the present invention or on the biaxially oriented polyester film of the present invention provided with an inorganic vapor deposition layer can be used as a packaging material.

The heat-sealable resin layer is usually formed by an extrusion lamination method or a dry lamination method.

As a thermoplastic polymer that forms the heat-sealable resin layer, any one may be used as long as the adhesive property of sealant can be sufficiently exerted. Polyethylene resins such as HDPE, LDPE, and LLDPE, and a polypropylene resin. an ethylene-vinyl acetate copolymer, an ethylene-α-olefin random copolymer, an ionomer resin, and the like can be used.

The sealant layer may be a single-layer film or a multilayer film, and may be selected depending on the required function. For example, from the viewpoint of imparting moisture resistance, a multilayer film in which a resin such as an ethylene-cyclic olefin copolymer or polymethylpentene is interposed can be used. In the sealant layer, various additives such as a flame retardant, a slipping agent, an anti-blocking agent, an oxidation inhibitor, a light stabilizer, and a tackifier may be blended.

The thickness of the sealant layer is preferably 10 to 100 µm, more preferably 20 to 60 µm.

Examples of the layer configuration of the laminated body for packaging material obtained using the biaxially oriented polyester film of the present invention as the substrate film include substrate film/gas barrier layer/protective layer, substrate film/gas barrier layer/protective layer/adhesive layer/sealant layer, substrate film/gas barrier layer/protective layer/adhesive layer/resin layer/adhesive layer/sealant layer, substrate film/adhesive layer/resin layer/gas barrier layer/protective layer/adhesive layer/sealant layer, substrate film/gas barrier layer/protective layer/printing layer/adhesive layer/sealant layer, substrate film/printing layer/gas barrier layer/protective layer/adhesive layer/sealant layer, substrate film/gas barrier layer/protective layer/adhesive layer/resin layer/printing layer/adhesive layer/sealant layer, substrate film/adhesive layer/resin layer/printing layer/gas barrier layer/protective layer/adhesive layer/sealant layer, substrate film/printing layer/gas barrier layer/protective layer/adhesive layer/resin layer/adhesive layer/sealant layer, substrate film/printing layer/adhesive layer/resin layer/gas barrier layer/protective layer/adhesive layer/sealant layer, and substrate film/adhesive layer/resin layer/gas barrier layer/protective layer/printing layer/adhesive layer/sealant layer.

The laminated body obtained using the biaxially oriented polyester film of the present invention can be suitably used for applications such as packaged products, various label materials, lid materials, sheet molded products, and laminated tubes. In particular, the laminated body is used for packaging bags (for example, pillow bags, pouches such as standing pouches and four side pouches). The thickness of the laminated body can be appropriately determined depending on the application. For example, the laminated body is used in the form of a film or sheet having a thickness of 5 to 500 μm, preferably about 10 to 300 μm.

EXAMPLES

Hereinafter, the present invention will be described in more detail with reference to Examples, but the present invention is not limited to the aspects of these Examples at all and can be appropriately modified without departing from the spirit of the present invention.
A. The Method for Evaluating the Polyester Resin is as Follows.
[Glass Transition Turning (Tg)]
Using a differential scanning calorimetry apparatus (Model DSC6220 manufactured by SII Nanotechnology Co., Ltd.), 5 mg of resin sample was melted to 280° C. in a nitrogen atmosphere, held for 5 minutes, and then rapidly cooled with liquid nitrogen, and the glass transition temperature thereof was measured from room temperature at a rate of temperature rise of 20° C./min.
[Intrinsic Viscosity (IV)]
In 50 ml of a mixed solvent of phenol/1,1,2,2-tetrachloroethane (60/40 (weight ratio)), 0.2 g of polyester resin was dissolved, and the intrinsic viscosity thereof was measured at 30° C. using an Ostwald viscometer. The unit is dl/g.
[Biomass Degree]
The biomass degree was calculated from the proportion of plant-derived carbon to the number of total carbon atoms determined in conformity with the radiocarbon (C14) measurement presented in ASTM D6866-16 Method B (AMS).
B. The Evaluation Method for the Polyester Film is as Follows.
[Thickness of Film]
The film thickness was measured using a dial gauge in conformity with JIS K7130-1999 method A.
[External Haze, Internal Haze, and Total Haze]
The obtained film was cut into an area of 5 cm in the machine direction and 5 cm in the transverse direction, and the total haze was measured at 25° C. at all wavelengths of visible light in conformity with JIS-K7136 using a turbidity meter (NDH5000) manufactured by NIPPON DENSHOKU INDUSTRIES Co., Ltd.

In the same manner, the haze (hereinafter referred to as "haze H1") of a laminated body having a configuration in which only cedar oil was sandwiched between two quartz glass plates and the haze (hereinafter referred to as "haze H2") of a laminated body having a configuration in which a polyester film of which the surface was uniformly wetted with cedar oil was sandwiched between two quartz glass plates were measured.

Next, the internal haze is determined according to the following equation.

$$\text{Internal haze} = \text{haze}(H2) - \text{haze}(H1) \quad \text{Equation 1}$$

The external haze is a value determined by subtracting the internal haze from the total haze.

The total haze, internal haze, and external haze all refer to haze at all wavelengths of visible light.
[Arithmetic Mean Height Sa and Maximum Height Sz]
The obtained film was cut into an area of 10 cm in the machine direction and 10 cm in the transverse direction, and a white laser interferometer (NEW VIEW 8300) manufactured by Zygo was used.

A 20× lens was attached to the interferometer, scanning was performed, and the arithmetic mean height (μm) and maximum height (μm) were measured. The measurement was performed in a range of 0.82 μm in the MD direction and 0.82 μm in the transverse direction of one surface, and the surface excluding foreign substances such as un-melted substances, dust and the like was targeted.

The measurement points were arbitrary 10 points of the sample of 10 cm×10 cm, and the average values were taken as the arithmetic mean height Sa and the maximum height Sz, respectively.

With regard to the variation (%) in the arithmetic mean height Sa, sampling was performed every 1,000 m from the surface layer of the film roll to the winding core in the machine direction of the obtained polyester film roll (width: 2,080 mm, winding length: 63,000 m). The measurement was performed on each sampled film under the conditions. The variation in the machine direction represented by the following Equation [1], where Xmax (N) denotes the maximum value of the acquired arithmetic mean height Sa, Xmin (N) denotes the minimum value, and Xave denotes the average value, was determined.
[Dynamic Friction Coefficient and Static Friction Coefficient]
A sample film was fabricated by cutting the obtained film into an area of 400 mm in the machine direction and 100 mm in the transverse direction. This was aged for 12 hours in an atmosphere of 23° C. and 65% RH, and divided into a test piece of 300 mm in the machine direction and 100 mm in the transverse direction for test table and a test piece of 100 mm in the machine direction and 100 mm in the transverse direction for sliding piece.

The test piece for test table was set on the test table, and the test piece for sliding piece was bonded to the bottom surface of a sliding piece having a metal load of 1.5 kg (area size: 39.7 mm$^2$, square) with double-sided tape so that the surfaces in contact with the casting drum faced each other.

The dynamic friction coefficient and the static friction coefficient were measured, respectively, at a sliding speed of the test piece of 200 ram/min, 23° C., and 65% RH by setting the conditions other than these so as to conform with JIS K-7125.
[Number of Fine Protrusions in Area of $4 \times 10^{-12}$ m$^2$ of Film Surface]
The obtained film was cut into an area of 10 mm in the machine direction and 10 mm in the transverse direction, and measurement was performed under the following observation conditions using a scanning probe microscope (SPM-9700) manufactured by Shimadzu Corporation, and an image of the measurement surface was captured.

The acquired image (height trace) was subjected to image processing under the following conditions.

Using the particle analysis software of the SPM-9700 series, the number of particles of 3 nm or more (number of protrusions) and the number of particles of less than 3 nm (number of protrusions) were counted in an area of $4 \times 10^{-12}$ m$^2$ (2 μm×2 μm square) by setting the threshold value of the particles extracted under the following particle analysis conditions to 3 nm. As the number of particles of less than 3 nm (number of protrusions), those of 0.01 nm or more were counted.

The measurement was performed 5 times at different locations, the one having the largest number of counts and the one having the smallest number of counts were excluded, and the average value of the numbers acquired in the rest 3 times was calculated and taken as the number of fine protrusions.

(Observation Conditions)
Cantilever: made of Si (silicon)
Scanning mode: phase mode
Scanning speed: 2 Hz
Scanning range: 2 μm
Number of pixels: 256×256
Offset X: 0 μm
Offset Y: 0 μm
Scanning angle: 0°
Operating point: 1.0 V
P gain: 0.001
I gain: 1500
Offset Z: 0 μm
Z range: ×2
Scanning mode: constant force (Image Processing)
Tilt correction: mean value in X direction (X), mean value in Y direction (Y), line fit (L)
Noise line removal: mode (range specification), automatic selection (Particle Analysis)
Target shape: particle
XY threshold value: 30%
Number of pixels to ignore: 5

With regard to the variation (%) in the number of fine protrusions, sampling was performed every 1,000 m from the surface layer of the film roll to the winding core in the machine direction of the obtained polyester film roll (width: 2080 mm, winding length: 63,000 m). The measurement was performed on each sampled film under the conditions. The variation in the machine direction represented by the following Equation [1], where Xmax (N) denotes the maximum value of the acquired number of fine protrusions, Xmin (N) denotes the minimum value, and Xave denotes the average value, was determined.

[Friction-Charged Electrostatic Potential]

A sample film was fabricated by cutting the obtained film into an area of 80 mm in the machine direction and 50 mm in the transverse direction. This was aged for 16 hours in an atmosphere of 23° C. and 50% RH. The friction-charged electrostatic potential was measured using a friction-charged electrostatic potential measuring apparatus (RST-300a) manufactured by DAIEI KAGAKU SEIKI MFG. CO., LTD.

The sample was fixed to the rotating apparatus, the static electricity generated by rubbing against a metal plate at a drum rotating speed of 400 rpm for 60 seconds was measured, and the maximum value was taken as the friction-charged electrostatic potential. The measured friction-charged electrostatic potential was evaluated according to the following criteria.

Excellent: Friction-charged electrostatic potential of less than 200 V
Favorable: Friction-charged electrostatic potential of 200 V or more and less than 500 V
Acceptable: Friction-charged electrostatic potential of 500 V or more and less than 1,000 V
Poor: Friction-charged electrostatic potential of 1,000 V or more

[Evaluation of Static Mark]

The obtained biaxially oriented polyester film row wound at 550 mm in the transverse direction and 500 m in the machine direction was rewound using a slitter (Model FN105E) manufactured by NISHIMURA MFG. CO., LTD. at a speed of 15 m/min and a winding tension of 100 N/m (unit tension setting).

For static electricity removal at this time, the static eliminator attached to the slitter was turned on, a static electricity eliminating brush ("NSP-2S" manufactured by ACHILLES CORPORATION) was installed between the unwinding roll and the tilt adjusting roller to be on the upper and lower surface sides of the film, and static electricity removal was performed.

The film was unwound from the film edge on the outermost surface of the obtained film roll, removed by 2 m from the film edge, and then sampled 10 cm in the center in the transverse direction and in a length of 10 cm in the machine direction, and the charged state of the film surface was visualized using a charging distribution determining toner manufactured by Kasuga Electric Works Ltd. The chargeability of the film roll was evaluated according to the following criteria.

Excellent: There is no static mark or static mark discharge mark or toner attachment.
Favorable: Static marks or static mark discharge marks are not observed, but toner is attached.
Poor: Static marks or static mark discharge marks are observed.

[Wetting Tension]

The corona-treated surface was measured in conformity with JIS-K-7100 according to the following procedure except that the obtained film was cut into an area of 400 mm in the machine direction and 300 mm in the transverse direction, and aged for 24 hours at a temperature of 23° C. and a relative humidity of 50% RH, and the test room atmosphere was set to a temperature of 23° C. and a relative humidity of 50% RH.

The test piece was placed on the substrate of the hand coater, few drops of the liquid mixture for test were dropped onto the test piece, and the wire bar was immediately pulled to spread the test mixture. In the case of spreading the liquid mixture for test using a cotton swab or a brush, the liquid is spread quickly over an area of at least 6 cm$^2$. The amount of liquid is adjusted so as not to form a pool but form a thin layer.

The wetting tension is judged by observing the liquid film of the liquid mixture for test in a bright place and the state of the liquid film after 3 seconds. The liquid film is wet when the liquid film does not break and keeps the state of being applied for 3 seconds or more.

When the wetting lasts for 3 seconds or more, the test piece is then advanced to the next liquid mixture having a higher surface tension.

On the contrary, when the liquid film breaks in 3 seconds or less, the test piece is advanced to the next liquid mixture having a lower surface tension. This operation is repeated to select a liquid mixture that can accurately wet the surface of the test piece in 3 seconds.

A new cotton swab is used for each test. Brushes or wire bars are washed with methanol and dried after each use since the evaporation of residual liquid changes the composition and the surface tension.

The operation to select a liquid mixture that can wet the surface of the corona-treated surface in 3 seconds is performed at least 3 times. The surface tension of the liquid mixture thus selected is reported as the wetting tension of the film.

The details of the raw material resin chips used in the present Examples and Comparative Examples are described below.

(Polyester Resin A)

As the carbon-neutral PET resin obtained using biomass-derived ethylene glycol, which was used in the fabrication of a biaxially stretched polyester film described later, a resin synthesized by the following method was used.

Magnesium acetate tetrahydrate in an amount to be 70 ppm as Mg atoms in the polyester was added to a mixture of terephthalic acid refined from a petroleum-derived raw material and ethylene glycol refined from a plant-derived raw material, and esterification reaction was conducted at a temperature of 255° C. at normal pressure. After that, antimony trioxide in an amount to be 280 ppm as Sb atoms in the polyester and trimethyl phosphate in an amount to be 40 ppm as P atoms in the polyester were added, and the reaction was further conducted at a temperature of 260° C. Subsequently, the reaction product was transferred to a polycondensation reaction tank, the pressure of the reaction system was gradually lowered while heating was performed to raise the temperature, and polycondensation was conducted at 280° C. under a reduced pressure of 133 Pa (1 mmHg) by a conventional method to obtain polyester chips having an intrinsic viscosity of 0.63 dl/g. This is taken as a polyester resin A. The biomass degree in this polyester resin A was measured, and was 17%.

(Polyester Resin B)

As PET resin derived from fossil fuel that was used to fabricate biaxially oriented polyester film as described below, terephthalic acid//ethylene glycol=100//100 (mol %) (intrinsic viscosity 0.62 dl/g; manufactured by Toyobo Co., Ltd.) was used.

(Polyester Resin C)

The temperature of an esterification reaction vessel was increased, and at the point in time when 200° C. was reached, a slurry consisting of terephthalic acid [86.4 parts by mass] and ethylene glycol [64.4 parts by mass] was loaded thereinto, and catalyst in the form of antimony trioxide [0.017 part by mass] and triethylamine [0.16 part by mass] was added thereto while this was agitated. Next, the temperature was raised by heating, and the pressure esterification reaction was conducted at a gauge pressure of 0.34 MPa and 240° C.

Thereafter, the inside of the esterification reactor was returned to normal pressure, and magnesium acetate tetrahydrate [0.071 parts by mass] and then trimethyl phosphate [0.014 parts by mass] were added. The temperature was further raised to 260° C. over 15 minutes, trimethyl phosphate [0.012 parts by mass] and then sodium acetate [0.0036 parts by mass] were added. After 15 minutes, dispersion treatment was performed using a high-pressure disperser, and ethylene glycol slurry of amorphous silica particles having an average particle size of 1.3 μm was added by 3.0 parts by weight based on the particle content. These silica particles were the particles obtained when an ethylene glycol slurry was prepared in advance, this was subjected to centrifugal separation processing, 35% of the coarse particulate fraction was removed, following which filtration treatment as carried out using a metal filter having 5-μm openings. After 15 minutes, the obtained esterification reaction product was transferred to a polycondensation reactor, and a polycondensation reaction was conducted under reduced pressure at 280° C. to obtain a polyester resin C having an intrinsic viscosity of 0.60 dl/g.

(Polyester Resins D, E, F, and G)

Polyester resins D, E, F, and G were obtained in the same manner as the polyester resin C except that the shape and average particle size of silica particles were changed.

The raw material resin chips are as presented in Table 1. The abbreviations in the table are as follows.

TPA: Terephthalic acid
EG: Ethylene glycol

TABLE 1

| | Polyester resin | | Silica | | | | |
|---|---|---|---|---|---|---|---|
| | Dicarboxylic acid component TPA | Polyhydric alcohol component EG | Shape | Weight average particle size μm | SiO2 content ppm | Biomass degree % | Intrinsic viscosity dl/g |
| Polyester resin A | Derived from fossil fuels | Derived from biomass | — | — | — | 17 | 0.63 |
| Polyester resin B | Derived from fossil fuels | Derived from fossil fuels | — | — | — | 0 | 0.62 |
| Polyester resin C | Derived from fossil fuels | Derived from fossil fuels | Amorphous | 1.3 | 30000 | 0 | 0.60 |
| Polyester resin D | Derived from fossil fuels | Derived from fossil fuels | Spherical | 1.0 | 30000 | 0 | 0.62 |
| Polyester resin E | Derived from fossil fuels | Derived from fossil fuels | Amorphous | 1.7 | 30000 | 0 | 0.60 |
| Polyester resin F | Derived from fossil fuels | Derived from fossil fuels | Amorphous | 2.4 | 30000 | 0 | 0.62 |
| Polyester resin G | Derived from fossil fuels | Derived from fossil fuels | Spherical | 0.5 | 30000 | 0 | 0.62 |

Example 1

A film having a three-layer configuration was formed using three extruders. The base layer (B) was composed of 98.7% by mass of polyester resin A and 1.3% by mass of polyester resin C, and the surface layer (A) was composed of 93.3% by mass of polyester resin A and 6.7% by mass of polyester resin C. Here, the polyester resin C was put through the inner pipe as illustrated in FIG. 4 so as to be mixed with other raw materials before entering the extruder. After each raw material resin was dried, the surface layer (A) forming mixed resin was melt-extruded from the first and third extruders at a resin temperature of 285° C., and the base layer (B) forming mixed resin was melted at a resin temperature of 285° C. using the second extruder. These resins were merged and laminated so that the thickness ratio in the T-die was 1/10/1 (μm) in the order of surface layer (A)/base layer (B)/surface layer (A) from the side coming into contact with the casting drum, discharged from a T-shaped mouthpiece, and cooled and solidified on the casting drum having a surface temperature of 30° C. to obtain an un-stretched polyethylene terephthalate sheet.

At that time, static electricity was applied using a wire-shaped electrode having a diameter of 0.15 mm, and the sheet was brought into close contact with a cooling drum to obtain a three-layer un-stretched film.

The obtained un-stretched film was heated to 115° C. and stretched in the machine direction at a total stretch ratio of 4.5 times by three-stage stretching in which the un-stretched film was stretched 1.24 times at the first stage, 1.4 times at the second stage, and 2.6 times at the third stage.

Subsequently, the stretched film was stretched in the transverse direction at a temperature of 140° C. and a stretch ratio of 4.3 times, heat-set at 245° C., and subjected to 5% heat relaxation treatment in the transverse direction. Corona treatment was performed on the layer A surface on the side in contact with the chill roll under the condition of 40 W·min/m², and the film was wound into a roll using a winder to fabricate a master roll (roll length: 26,000 m, width: 8,000 mm) of a biaxially oriented polyester film having a thickness of 12 μm.

The biaxially oriented polyester film was unwound from the obtained master roll, and the film roll was wound around a winding core having a diameter of 6 inches (152.2 mm) while performing slitting at a width of 2,200 mm and applying surface pressure to the film roll using a contact roll and tension to the film using a 2-axis turret winder.

Table 2 presents the raw material composition and film forming conditions of the obtained film and the physical properties and evaluation results of the obtained film. The evaluation of film was performed on the layer A surface on the side in contact with the chill roll.

Example 2

A biaxially stretched film was formed in the same manner as in Example 1 except that the polyester resin A of the surface layer (A) was changed to 95.0% by mass and the polyester resin C was changed to 5.0% by mass as raw materials, and a biaxially oriented polyester film having a thickness of 12 μm was obtained. Table 2 presents the raw material composition and film forming conditions of the obtained film and the physical properties and evaluation results of the obtained film. The evaluation of film was performed on the layer A surface on the side in contact with the chill roll.

Example 3

A biaxially stretched film was formed in the same manner as in Example 1 except that the polyester resin A of the surface layer (A) was changed to 96.0% by mass and the polyester resin D was changed to 4.0% by mass, and the polyester resin of the base layer (B) was changed to the polyester resin D as raw materials, and a biaxially oriented polyester film having a thickness of 12 μm was obtained. Table 2 presents the raw material composition and film forming conditions of the obtained film and the physical properties and evaluation results of the obtained film. The evaluation of film was performed on the layer A surface on the side in contact with the chill roll.

Example 4

A biaxially stretched film was formed in the same manner as in Example 1 except that the polyester resin A of the surface layer (A) was changed to 92.0% by mass and the polyester resin E was changed to 8.0% by mass, and the polyester resin of the base layer (B) was changed to the polyester resin E as raw materials, and a biaxially oriented polyester film having a thickness of 12 μm was obtained. Table 2 presents the raw material composition and film forming conditions of the obtained film and the physical properties and evaluation results of the obtained film. The evaluation of film was performed on the layer A surface on the side in contact with the chill roll.

Comparative Example 1

A biaxially stretched film was formed in the same manner as in Example 1 except that the polyester resins of the surface layer (A) and base layer (B) were changed to the polyester resin B as raw materials, and a biaxially oriented polyester film having a thickness of 12 μm was obtained. Table 2 presents the raw material composition and film forming conditions of the obtained film and the physical properties and evaluation results of the obtained film. The evaluation of film was performed on the layer A surface on the side in contact with the chill roll.

Comparative Example 2

A biaxially stretched film was formed in the same manner as in Example 1 except that the polyester resin A of the surface layer (A) was changed to 95.0% by mass and the polyester resin F was changed to 5.0% by mass, and the polyester resin of the base layer (B) was changed to the polyester resin F as raw materials, and a biaxially oriented polyester film having a thickness of 12 μm was obtained. Table 2 presents the raw material composition and film forming conditions of the obtained film and the physical properties and evaluation results of the obtained film. The evaluation of film was performed on the layer A surface on the side in contact with the chill roll.

Comparative Example 3

A biaxially stretched film was formed in the same manner as in Example 1 except that the polyester resin A of the surface layer (A) was changed to 95.0% by mass and the polyester resin G was changed to 5.0% by mass, and the polyester resin of the base layer (B) was changed to the polyester resin G as raw materials, and a biaxially oriented polyester film having a thickness of 12 μm was obtained. Table 2 presents the raw material composition and film forming conditions of the obtained film and the physical properties and evaluation results of the obtained film. The evaluation of film was performed on the layer A surface on the side in contact with the chill roll.

Reference Example 1

A film having a three-layer configuration was formed using three extruders in the same manner as in Example 1. The base layer (B) was composed of 98.7% by mass of polyester resin A and 1.3% by mass of polyester resin C, and the surface layer (A) was composed of 93.3% by mass of polyester resin A and 6.7% by mass of polyester resin C. However, the polyester resin A and the polyester resin C were all put into the extruder in a mixed state. However, the polyester resin C was put into the extruder in a state of being mixed at the upper part of the hopper without using the inner pipe. After each raw material resin was dried, the surface layer (A) forming mixed resin was melt-extruded from the first and third extruders at a resin temperature of 285° C., and the base layer (B) forming mixed resin was melted at a resin temperature of 285° C. using the second extruder. These resins were merged and laminated so that the thickness ratio in the T-die was 1/10/1 (μm) in the order of surface layer (A)/base layer (B)/surface layer (A) from the side coming into contact with the casting drum, discharged from a T-shaped mouthpiece, and cooled and solidified on the casting drum having a surface temperature of 30° C. to obtain an un-stretched polyethylene terephthalate sheet. At that time, static electricity was applied using a wire-shaped electrode having a diameter of 0.15 mm, and the sheet was brought into close contact with a cooling drum to obtain a three-layer un-stretched film.

The obtained un-stretched film was heated to 115° C. and stretched in the machine direction at a total stretch ratio of 4.5 times by three-stage stretching in which the un-stretched film was stretched 1.24 times at the first stage, 1.4 times at the second stage, and 2.6 times at the third stage.

Subsequently, the stretched film was stretched in the transverse direction at a temperature of 140° C. and a stretch ratio of 4.3 times, heat-set at 245° C., and subjected to 5% heat relaxation treatment in the transverse direction. Corona treatment was performed on the layer A surface on the side in contact with the chill roll under the condition of 40 W·min/m$^2$, the stretched film was subsequently stretched in the transverse direction at a temperature of 140° C. and a stretch ratio of 4.3 times, heat-set at 245° C., and subjected to 5% heat relaxation treatment in the transverse direction, and the film was wound into a roll using a winder to fabricate a master roll (roll length: 26,000 m, width: 8,000 mm) of a biaxially oriented polyester film having a thickness of 12 μm.

The biaxially oriented polyester film was unwound from the obtained master roll, and the film roll was wound around a winding core having a diameter of 6 inches (152.2 mm) while performing slitting at a width of 2,200 mm and applying surface pressure to the film roll using a contact roll and tension to the film using a 2-axis turret winder. Table 2 presents the raw material composition and film forming conditions of the obtained film and the physical properties and evaluation results of the obtained film. The evaluation of film was performed on the layer A surface on the side in contact with the chill roll.

As the results in Table 2, the films of Examples 1 to 4 had the number of fine protrusions each having a height of 3 nm or more, the number of fine protrusions each having a height of less than 3 nm, and the arithmetic mean height Sa within the prescribed ranges and thus had few quality defects due to charging such as static marks and static mark discharge marks, exhibited excellent performance after secondary processing such as coating and vapor deposition, were environmentally friendly polyester films produced using carbon-neutral polyester resins obtained using biomass-derived ethylene glycol, and had little variations in physical properties in the machine direction when being wound into a long film roll having a long winding length as well.

The obtained film of Comparative Example 1 had the number of fine protrusions each having a height of 3 nm or more, the number of fine protrusions each having a height of less than 3 nm, and the arithmetic mean height Sa within the prescribed ranges, and thus had few quality defects due to charging such as static marks and static mark discharge marks, exhibited excellent performance after secondary processing such as coating and vapor deposition, but was a conventional fossil fuel-derived polyester resin, and thus was inferior as an environmentally friendly polyester film.

The obtained film of Comparative Example 2 had the number of fine protrusions each having a height of 3 nm or more within the range, but had a small number of fine protrusions each having a height of less than 3 nm, thus had a high friction-charged electrostatic potential, and was poor in the static mark evaluation. Moreover, the film had a too large arithmetic mean height Sa, thus had a large external haze, and was inferior in transparency.

The obtained film of Comparative Example 3 had the number of fine protrusions each having a height of 3 nm or more within the range, but had a small number of fine protrusions each having a height of less than 3 nm, thus had a high friction-charged electrostatic potential, and was poor in the static mark evaluation.

In Reference Example 1, although the number of fine protrusions each having a height of 3 nm or more and the number of fine protrusions each having a height of less than 3 nm of the obtained film varied greatly in the machine direction, it was possible to obtain a favorable film having physical properties equivalent to those in Examples 1 to 4 partially in the film roll, the film roll was inferior as a film roll since the inner pipe was not used to supply the raw materials, and the raw material ratio fluctuated greatly in the machine direction because of the segregation of raw materials.

TABLE 2A

|  |  | Working Example 1 | | | Working Example 2 | | |
|---|---|---|---|---|---|---|---|
|  |  | Layer A | Layer B | Layer A | Layer A | Layer B | Layer A |
| Resin chip mixing ratio (% by mass) | Polyester resin A | 93.3 | 98.7 | 93.3 | 95 | 98.7 | 95 |
|  | Polyester resin B | — | — | — | — | — | — |
|  | Polyester resin C | 6.7 | 1.3 | 6.7 | 5 | 1.3 | 5 |
|  | Polyester resin D | — | — | — | — | — | — |
|  | Polyester resin E | — | — | — | — | — | — |
|  | Polyester resin F | — | — | — | — | — | — |
|  | Polyester resin G | — | — | — | — | — | — |
|  | Shape of silica | | Amorphous | | | Amorphous | |
|  | Weight average particle size of silica (μm) | | 1.3 | | | 1.3 | |
|  | Amount of silica added (ppm by weight) | 2000 | 400 | 2000 | 1500 | 400 | 1500 |
| Film forming step | Inner pipe | | Presence | | | Presence | |
|  | Angle of repose (degrees) * Polyester resin pellets containing particles | | 37 | | | 37 | |
|  | Isophthalic acid content rate (mol %) | | 1.96 | | | 1.96 | |
|  | Thickness of T-die layer (μm) | | A/B/A = 1/10/1 | | | A/B/A = 1/10/1 | |
|  | Application of static electricity | | Wire-shaped electrode diameter 0.15 mm | | | Wire-shaped electrode diameter 0.15 mm | |
|  | Chill roll cooling temperature (° C.) | | 30 | | | 30 | |
|  | Stretch temperature in machine direction (° C.) | | 115 | | | 115 | |
|  | First stage stretch ratio in machine direction (times) | | 1.24 | | | 1.24 | |
|  | Second stage stretch ratio in machine direction (times) | | 1.4 | | | 1.4 | |

TABLE 2A-continued

| | | | |
|---|---|---|---|
| | Third stage stretch ratio in machine direction (times) | 2.6 | 2.6 |
| | Stretch ratio in machine direction (times) | 4.5 | 4.5 |
| | Stretch temperature in transverse direction (° C.) | 140 | 140 |
| | Stretch ratio in transverse direction (times) | 4.3 | 4 |
| | Heat setting temperature (° C.) | 245 | 245 |
| | Relaxation rate in transverse direction (%) | 5 | 5 |
| | Film thickness (μm) | 12 | 12 |
| Film properties | Biomass degree (%) | 17 | 17 |
| | Biomass degree (%) * In film | 16.6 | 16.7 |
| | Number of fine protrusions having height of less than 3 nm per $4 \times 10^{-12}$ m² (ke) — Average value (Xave) | 347 | 267 |
| | Maximum value (Xmax) | 357 | 280 |
| | Minimum value (Xmin) | 344 | 259 |
| | Variation in machine direction | 4 | 8 |
| | Number of fine protrusions having height of 3 nm or more per $4 \times 10^{-12}$ m² (ke) — Average value (Xave) | 544 | 372 |
| | Maximum value (Xmax) | 560 | 391 |
| | Minimum value (Xmin) | 539 | 361 |
| | Variation in machine direction | 4 | 8 |
| | Arithmetic mean height Sa (μm) — Average value (Xave) | 0.020 | 0.019 |
| | Maximum value (Xmax) | 0.021 | 0.020 |
| | Minimum value (Xmin) | 0.020 | 0.018 |
| | Variation in machine direction | 4 | 8 |
| | Static friction coefficient | 0.39 | 0.40 |
| | Dynamic friction coefficient | 0.37 | 0.39 |
| | Maximum height $S_z$ (μm) | 1.6 | 1.6 |
| | External haze (%) | 1.3 | 1.2 |
| | Internal haze (%) | 1.6 | 1.6 |
| | Friction-charged electrostatic potential (V) | 112 | 294 |
| | Evaluation of static mark | Excellent | Favorable |
| | Wetting tension (mN/m) | 53 | 52 |

| | | Working Example 3 | | | Working Example 4 | | |
|---|---|---|---|---|---|---|---|
| | | Layer A | Layer B | Layer A | Layer A | Layer B | Layer A |
| Resin chip mixing ratio (% by mass) | Polyester resin A | 96 | 98.7 | 96 | 92 | 98.7 | 92 |
| | Polyester resin B | — | — | — | — | — | — |
| | Polyester resin C | — | — | — | — | — | — |
| | Polyester resin D | 4 | 1.3 | 4 | — | — | — |
| | Polyester resin E | — | — | — | 8 | 1.3 | 8 |
| | Polyester resin F | — | — | — | — | — | — |
| | Polyester resin G | — | — | — | — | — | — |
| | Shape of silica | | Spherical | | | Amorphous | |
| | Weight average particle size of silica (μm) | | 1.0 | | | 1.7 | |
| | Amount of silica added (ppm by weight) | 1200 | 400 | 1200 | 2400 | 400 | 2400 |
| Film forming step | Inner pipe | | Presence | | | Presence | |
| | Angle of repose (degrees) * Polyester resin pellets containing particles | | 36 | | | 37 | |
| | Isophthalic acid content rate (mol %) | | 1.97 | | | 1.95 | |
| | Thickness of T-die layer (μm) | | A/B/A = 1/10/1 | | | A/B/A = 1/10/1 | |
| | Application of static electricity | | Wire-shaped electrode diameter 0.15 mm | | | Wire-shaped electrode diameter 0.15 mm | |
| | Chill roll cooling temperature (° C.) | | 30 | | | 30 | |
| | Stretch temperature in machine direction (° C.) | | 115 | | | 115 | |
| | First stage stretch ratio in machine direction (times) | | 1.24 | | | 1.24 | |
| | Second stage stretch ratio in machine direction (times) | | 1.4 | | | 1.4 | |
| | Third stage stretch ratio in machine direction (times) | | 2.6 | | | 2.6 | |
| | Stretch ratio in machine direction (times) | | 4.5 | | | 4.5 | |
| | Stretch temperature in transverse direction (° C.) | | 140 | | | 140 | |
| | Stretch ratio in transverse direction (times) | | 4.3 | | | 4.3 | |
| | Heat setting temperature (° C.) | | 245 | | | 245 | |
| | Relaxation rate in transverse direction (%) | | 5 | | | 5 | |
| | Film thickness (μm) | | 12 | | | 12 | |
| Film properties | Biomass degree (%) | | 17 | | | 17 | |
| | Biomass degree (%) * In film | | 16.7 | | | 16.6 | |
| | Number of fine protrusions having height of less than 3 nm per $4 \times 10^{-12}$ m² (ke) — Average value (Xave) | | 476 | | | 572 | |
| | Maximum value (Xmax) | | 495 | | | 601 | |
| | Minimum value (Xmin) | | 466 | | | 549 | |
| | Variation in machine direction | | 6 | | | 9 | |
| | Number of fine protrusions — Average value (Xave) | | 331 | | | 352 | |
| | Maximum value (Xmax) | | 344 | | | 370 | |

TABLE 2A-continued

|  |  |  |  |
|---|---|---|---|
| having height of 3 nm or more per $4 \times 10^{-12}$ m² (ke) | Minimum value (Xmin) | 324 | 338 |
|  | Variation in machine direction | 6 | 9 |
| Arithmetic mean height Sa (μm) | Average value (Xave) | 0.015 | 0.021 |
|  | Maximum value (Xmax) | 0.016 | 0.022 |
|  | Minimum value (Xmin) | 0.015 | 0.020 |
|  | Variation in machine direction | 6 | 9 |
| Static friction coefficient |  | 0.40 | 0.37 |
| Dynamic friction coefficient |  | 0.37 | 0.36 |
| Maximum height $S_z$ (μm) |  | 1.4 | 1.8 |
| External haze (%) |  | 0.5 | 1.3 |
| Internal haze (%) |  | 1.5 | 1.7 |
| Friction-charged electrostatic potential (V) |  | 153 | 109 |
| Evaluation of static mark |  | Excellent | Excellent |
| Wetting tension (mN/m) |  | 53 | 53 |

TABLE 2B

|  |  | Comparative Example 1 | | | Comparative Example 2 | | |
|---|---|---|---|---|---|---|---|
|  |  | Layer A | Layer B | Layer A | Layer A | Layer B | Layer A |
| Resin chip mixing ratio (% by mass) | Polyester resin A | — | — | — | 95 | 98.7 | 95 |
|  | Polyester resin B | 93.3 | 98.7 | 93.3 | — | — | — |
|  | Polyester resin C | 6.7 | 1.3 | 6.7 | — | — | — |
|  | Polyester resin D | — | — | — | — | — | — |
|  | Polyester resin E | — | — | — | — | — | — |
|  | Polyester resin F | — | — | — | 5 | 1.3 | 5 |
|  | Polyester resin G | — | — | — | — | — | — |
|  | Shape of silica | | Amorphous | | | Amorphous | |
|  | Weight average particle size of silica (μm) | | 1.3 | | | 2.7 | |
|  | Amount of silica added (ppm by weight) | 2000 | 400 | 2000 | 1500 | 400 | 1500 |
| Film forming step | Inner pipe | | Presence | | | Presence | |
|  | Angle of repose (degrees) * Polyester resin pellets containing particles | | 37 | | | 38 | |
|  | Isophthalic acid content rate (mol %) | | 0.00 | | | 1.96 | |
|  | Thickness of T-die layer (μm) | | A/B/A = 1/10/1 | | | A/B/A = 1/10/1 | |
|  | Application of static electricity | | Wire-shaped electrode diameter 0.15 mm | | | Wire-shaped electrode diameter 0.15 mm | |
|  | Chill roll cooling temperature (° C.) | | 30 | | | 30 | |
|  | Stretch temperature in machine direction (° C.) | | 115 | | | 115 | |
|  | First stage stretch ratio in machine direction (times) | | 1.24 | | | 1.24 | |
|  | Second stage stretch ratio in machine direction (times) | | 1.4 | | | 1.4 | |
|  | Third stage stretch ratio in machine direction (times) | | 2.6 | | | 2.6 | |
|  | Stretch ratio in machine direction (times) | | 4.5 | | | 4.5 | |
|  | Stretch temperature in transverse direction (° C.) | | 140 | | | 140 | |
|  | Stretch ratio in transverse direction (times) | | 4.3 | | | 4.3 | |
|  | Heat setting temperature (° C.) | | 245 | | | 245 | |
|  | Relaxation rate in transverse direction (%) | | 5 | | | 5 | |
|  | Film thickness (μm) | | 12 | | | 12 | |
| Film properties | Biomass degree (%) | | 0 | | | 17 | |
|  | Biomass degree (%) * In film | | 0.0 | | | 16.7 | |
|  | Number of fine protrusions having height of less than 3 nm per $4 \times 10^{-12}$ m² (ke) | Average value (Xave) | 361 | | | 71 | |
|  |  | Maximum value (Xmax) | 379 | | | 75 | |
|  |  | Minimum value (Xmin) | 347 | | | 68 | |
|  |  | Variation in machine direction | 9 | | | 10 | |
|  | Number of fine protrusions having height of 3 nm or more per $4 \times 10^{-12}$ m² (ke) | Average value (Xave) | 532 | | | 313 | |
|  |  | Maximum value (Xmax) | 559 | | | 332 | |
|  |  | Minimum value (Xmin) | 511 | | | 300 | |
|  |  | Variation in machine direction | 9 | | | 10 | |
|  | Arithmetic mean height Sa (μm) | Average value (Xave) | 0.021 | | | 0.030 | |
|  |  | Maximum value (Xmax) | 0.022 | | | 0.032 | |
|  |  | Minimum value (Xmin) | 0.020 | | | 0.029 | |
|  |  | Variation in machine direction | 9 | | | 10 | |
|  | Static friction coefficient | | 0.38 | | | 0.42 | |
|  | Dynamic friction coefficient | | 0.37 | | | 0.40 | |
|  | Maximum height $S_z$ (μm) | | 1.6 | | | 2.4 | |
|  | External haze (%) | | 1.3 | | | 2.0 | |
|  | Internal haze (%) | | 1.6 | | | 1.1 | |
|  | Friction-charged electrostatic potential (V) | | 117 | | | 1454 | |
|  | Evaluation of static mark | | Excellent | | | Poor | |
|  | Wetting tension (mN/m) | | 52 | | | 54 | |

TABLE 2B-continued

|  |  | Comparative Example 3 | | | Reference Example 1 | | |
|---|---|---|---|---|---|---|---|
|  |  | Layer A | Layer B | Layer A | Layer A | Layer B | Layer A |
| Resin chip mixing ratio (% by mass) | Polyester resin A | 95 | 98.7 | 95 | 93.3 | 98.7 | 93.3 |
|  | Polyester resin B | — | — | — | — | — | — |
|  | Polyester resin C | — | — | — | 6.7 | 1.3 | 6.7 |
|  | Polyester resin D | — | — | — | — | — | — |
|  | Polyester resin E | — | — | — | — | — | — |
|  | Polyester resin F | — | — | — | — | — | — |
|  | Polyester resin G | 5 | 1.3 | 5 | — | — | — |
|  | Shape of silica |  | Spherical |  |  | Amorphous |  |
|  | Weight average particle size of silica (μm) |  | 0.5 |  |  | 1.3 |  |
|  | Amount of silica added (ppm by weight) | 1500 | 400 | 1500 | 2000 | 400 | 2000 |
| Film forming step | Inner pipe |  | Presence |  |  | Absence |  |
|  | Angle of repose (degrees) * Polyester resin pellets containing particles |  | 38 |  |  | 37 |  |
|  | Isophthalic acid content rate (mol %) |  | 1.96 |  |  | 1.96 |  |
|  | Thickness of T-die layer (μm) |  | A/B/A = 1/10/1 |  |  | A/B/A = 1/10/1 |  |
|  | Application of static electricity |  | Wire-shaped electrode diameter 0.15 mm |  |  | Wire-shaped electrode diameter 0.15 mm |  |
|  | Chill roll cooling temperature (° C.) |  | 30 |  |  | 30 |  |
|  | Stretch temperature in machine direction (° C.) |  | 115 |  |  | 115 |  |
|  | First stage stretch ratio in machine direction (times) |  | 1.24 |  |  | 1.24 |  |
|  | Second stage stretch ratio in machine direction (times) |  | 1.4 |  |  | 1.4 |  |
|  | Third stage stretch ratio in machine direction (times) |  | 2.6 |  |  | 2.6 |  |
|  | Stretch ratio in machine direction (times) |  | 4.5 |  |  | 4.5 |  |
|  | Stretch temperature in transverse direction (° C.) |  | 140 |  |  | 140 |  |
|  | Stretch ratio in transverse direction (times) |  | 4.3 |  |  | 4.3 |  |
|  | Heat setting temperature (° C.) |  | 245 |  |  | 245 |  |
|  | Relaxation rate in transverse direction (%) |  | 5 |  |  | 5 |  |
|  | Film thickness (μm) |  | 12 |  |  | 12 |  |
| Film properties | Biomass degree (%) |  | 17 |  |  | 17 |  |
|  | Biomass degree (%) * In film |  | 16.7 |  |  | 16.6 |  |
|  | Number of fine protrusions having height of less than 3 nm per $4 \times 10^{-12}$ m² (ke) | Average value (Xave) |  | 216 |  |  | 329 |  |
|  |  | Maximum value (Xmax) |  | 229 |  |  | 365 |  |
|  |  | Minimum value (Xmin) |  | 205 |  |  | 237 |  |
|  |  | Variation in machine direction |  | 11 |  |  | 39 |  |
|  | Number of fine protrusions having height of 3 nm or more per $4 \times 10^{-12}$ m² (ke) | Average value (Xave) |  | 321 |  |  | 551 |  |
|  |  | Maximum value (Xmax) |  | 340 |  |  | 612 |  |
|  |  | Minimum value (Xmin) |  | 305 |  |  | 408 |  |
|  |  | Variation in machine direction |  | 11 |  |  | 37 |  |
|  | Arithmetic mean height Sa (μm) | Average value (Xave) |  | 0.008 |  |  | 0.022 |  |
|  |  | Maximum value (Xmax) |  | 0.008 |  |  | 0.025 |  |
|  |  | Minimum value (Xmin) |  | 0.008 |  |  | 0.017 |  |
|  |  | Variation in machine direction |  | 11 |  |  | 36 |  |
|  | Static friction coefficient |  | 0.45 |  |  | 0.39 |  |
|  | Dynamic friction coefficient |  | 0.40 |  |  | 0.38 |  |
|  | Maximum height $S_z$ (μm) |  | 0.2 |  |  | 1.6 |  |
|  | External haze (%) |  | 1.1 |  |  | 1.4 |  |
|  | Internal haze (%) |  | 1.1 |  |  | 1.7 |  |
|  | Friction-charged electrostatic potential (V) |  | 1360 |  |  | 129/1381 |  |
|  | Evaluation of static mark |  | Poor |  |  | Excellent/Poor |  |
|  | Wetting tension (mN/m) |  | 51 |  |  | 52 |  |

INDUSTRIAL APPLICABILITY

The biaxially oriented polyester film of the present invention exhibits excellent transparency, and the film roll is less likely to wrinkle when the film is wound into a film roll at the time of film production or after fslit, the film is easily unwound from the film roll, and thus it is easy to perform secondary processing such as coating and vapor deposition.

In addition, it is possible to provide a biaxially oriented polyester film, which has few quality defects due to charging such as static marks and static mark discharge marks, has excellent performance after secondary processing such as coating and vapor deposition, is an environmentally friendly polyester film produced using a carbon-neutral polyester resin obtained using biomass-derived ethylene glycol, and has little variations in physical properties in the machine direction when being wound into a long film roll having a long winding length as well, and a production method therefor.

Consequently, the biaxially oriented polyester film is useful in food packaging applications, particularly applications for films exhibiting gas barrier properties, and is expected to greatly contribute to the industrial world.

The invention claimed is:

1. A biaxially oriented polyester film formed of a polyester resin composition containing particles and 50% by weight or more of a polyester resin composed of biomass-derived ethylene glycol and fossil fuel-derived dicarboxylic acid units, wherein at least one surface of the biaxially oriented polyester film meets all of the following requirements (1) to (3):
   (1) a number of fine protrusions each having a height of less than 3 nm per area of $4 \times 10^{-12}$ m² is 250 or more and 600 or less;

(2) a number of fine protrusions each having a height of 3 nm or more per area of $4\times10^{-12}$ m$^2$ is 300 or more and 600 or less; and (3) an arithmetic mean height Sa is 0.010 μm or more and 0.025 μm or less.

2. The biaxially oriented polyester film according to claim 1, wherein a content of biomass-derived carbon by radiocarbon (C14) measurement is 10% to 18% with respect to total carbon in the polyester resin composition constituting the biaxially oriented polyester film.

3. The biaxially oriented polyester film according to claim 1, wherein a dynamic friction coefficient between a surface meeting all of the requirements (1) to (3) of the biaxially oriented polyester film and a surface facing the surface is 0.20 or more and 0.60 or less.

4. The biaxially oriented polyester film according to claim 1, wherein a wetting tension of a surface meeting all of the requirements (1) to (3) of the biaxially oriented polyester film is 50 mN/m or more.

5. The biaxially oriented polyester film according to claim 1, wherein an external haze of the biaxially oriented polyester film is 1.8% or less and an internal haze is 2.0% or less.

6. A biaxially oriented polyester film roll, which is a film roll obtained by winding the biaxially oriented polyester film according to claim 1 into a roll, wherein a variation in a number of fine protrusions each having a height of less than 3 nm per area of $4\times10^{-12}$ m$^2$ and a variation in a number of fine protrusions each having a height of 3 nm or more per area of $4\times10^{-12}$ m$^2$ when sampling is performed every 1,000 m from a surface layer of the film roll to a winding core in a machine direction of the film are both 40% or less:

(each variation is expressed by the following Equation [1] where Xmax denotes a maximum value, Xmin denotes a minimum value, and Xave denotes an average value, variation (%)=100×(Xmax−Xmin)/Xave   [1]).

7. The biaxially oriented polyester film roll according to claim 6, wherein a variation in an arithmetic mean height Sa when sampling is performed every 1,000 m from a surface layer of the film roll to a winding core in a machine direction of the film is 40% or less:

(variation is expressed by the following Equation [2] where Xmax denotes a maximum value of an arithmetic mean height Sa, Xmin denotes a minimum value, and Xave denotes an average value, variation (%)=100×(Xmax−Xmin)/Xave   [2]).

8. A production method for the biaxially oriented polyester film according to claim 1, the production method comprising a step of performing melt extrusion of a polyester raw material resin and a biaxial stretching step, wherein the step of performing melt extrusion of the polyester raw material resin includes a step of supplying raw material resin chips of a carbon-neutral polyester resin obtained using the biomass-derived ethylene glycol to a hopper from above as well as supplying raw material resin chips of a polyester resin composition containing the particles through a pipe having an outlet in the hopper and directly above an extruder, mixing both chips, and melt-extruding the mixture.

9. A production method for the biaxially oriented polyester film roll according to claim 6, the production method comprising a step of performing melt extrusion of a polyester raw material resin, a biaxial stretching step, and a step of winding a film after being biaxially stretched into a roll, wherein the step of performing melt extrusion of the polyester raw material resin includes a step of supplying raw material resin chips of a carbon-neutral polyester resin obtained using the biomass-derived ethylene glycol to a hopper from above as well as supplying raw material resin chips of a polyester resin composition containing the particles through a pipe having an outlet in the hopper and directly above an extruder, mixing both chips, and melt-extruding the mixture.

10. The biaxially oriented polyester film according to claim 1, wherein the number of the fine protrusions each having the height of 3 nm or more per area of $4\times10^{-12}$ m$^2$ is greater than 300 but not greater than 600.

11. The biaxially oriented polyester film according to claim 1, wherein the number of the fine protrusions each having the height of 3 nm or more per area of $4\times10^{-12}$ m$^2$ is not less than 372 but not greater than 600.

12. The biaxially oriented polyester film according to claim 1, wherein the number of the fine protrusions each having the height of 3 nm or more per area of $4\times10^{-12}$ m$^2$ is not less than 400 but not greater than 600.

13. The biaxially oriented polyester film according to claim 1, wherein the particles includes silica particles.

14. A vapor-deposited film comprising:
the biaxially oriented polyester film according to claim 1 and
an inorganic layer that covers at least one surface of the biaxially oriented polyester film.

15. The vapor-deposited film according to claim 14, wherein a thickness of the inorganic layer is not less than 1 nm but not greater than 100 nm.

16. A laminated body comprising:
the vapor-deposited film according to claim 14 and
a protective layer provided on the inorganic layer of the vapor-deposited film.

17. The laminated body according to claim 16, wherein a thickness of the laminated body is not less than 5 μm but not greater than 500 μm.

* * * * *